(12) United States Patent
Wilcox

(10) Patent No.: US 12,358,010 B2
(45) Date of Patent: Jul. 15, 2025

(54) METHODS AND APPARATUS TO CONTROL AGRICULTURAL APPLICATION RATES

(71) Applicant: Deere & Company, Moline, IL (US)

(72) Inventor: Timothy A. Wilcox, Cissna Park, IL (US)

(73) Assignee: Deere & Company, Moline, IL (US)

( * ) Notice: Subject to any disclaimer, the term of this patent is extended or adjusted under 35 U.S.C. 154(b) by 522 days.

(21) Appl. No.: 17/203,243

(22) Filed: Mar. 16, 2021

(65) Prior Publication Data

US 2022/0297148 A1   Sep. 22, 2022

(51) Int. Cl.
| | |
|---|---|
| *B05B 12/12* | (2006.01) |
| *A01C 23/00* | (2006.01) |
| *A01G 25/16* | (2006.01) |
| *A01M 7/00* | (2006.01) |
| *B05B 12/08* | (2006.01) |
| *B05B 13/00* | (2006.01) |
| *G05D 1/00* | (2024.01) |

(52) U.S. Cl.
CPC .............. *B05B 12/12* (2013.01); *A01G 25/16* (2013.01); *B05B 12/081* (2013.01); *B05B 13/005* (2013.01); *G05D 1/0219* (2013.01); *A01C 23/00* (2013.01); *A01M 7/0089* (2013.01)

(58) Field of Classification Search
CPC ..... B05B 12/12; B05B 12/081; B05B 13/005; A01G 25/16; G05D 1/0219; G05D 2201/0201; A01C 23/00; A01C 21/005; A01M 7/0089; A01M 9/0092
See application file for complete search history.

(56) References Cited

U.S. PATENT DOCUMENTS

| | | | |
|---|---|---|---|
| 5,590,611 A * | 1/1997 | Smith | A01C 23/025 |
| | | | 172/507 |
| 9,338,938 B2 | 5/2016 | Cash et al. | |
| 2004/0079152 A1* | 4/2004 | Sorenson | G01F 23/38 |
| | | | 702/45 |

(Continued)

FOREIGN PATENT DOCUMENTS

| | | | |
|---|---|---|---|
| EP | 2057877 B1 | 10/2012 | |
| EP | 2532220 A1 * | 12/2012 | ............. A01C 21/00 |

(Continued)

OTHER PUBLICATIONS

Extended European Search Report and Written Opinion issued in European Patent Application No. 22157295.1, dated Aug. 12, 2022, in 08 pages.

*Primary Examiner* — Chad G Erdman
(74) *Attorney, Agent, or Firm* — HANLEY, FLIGHT & ZIMMERMAN, LLC

(57) ABSTRACT

Methods and apparatus to control agricultural product application rates are disclosed. An example system to control agricultural product application rates includes a field area processor to determine an area of a field to be covered, and an application rate processor including an end product processor to determine an amount of product to be utilized during an application session, the amount of product to be utilized based on an amount of product on a vehicle and a final product amount, and an application rate calculator to determine a first application rate to be implemented by an applicator based on the amount of product to be utilized and the area of the field to be covered.

24 Claims, 8 Drawing Sheets

(56) References Cited

U.S. PATENT DOCUMENTS

| | | | |
|---|---|---|---|
| 2006/0265106 A1* | 11/2006 | Giles | A01B 79/005 |
| | | | 700/283 |
| 2009/0039172 A1* | 2/2009 | Vickers | A01M 7/0014 |
| | | | 239/71 |
| 2010/0032492 A1* | 2/2010 | Grimm | A01M 7/0089 |
| | | | 239/76 |
| 2016/0304300 A1* | 10/2016 | Beaujot | B65G 65/42 |
| 2018/0084710 A1* | 3/2018 | Lawson | B62D 15/025 |
| 2020/0015412 A1* | 1/2020 | Kowalchuk | A01C 7/12 |
| 2020/0113169 A1* | 4/2020 | Jelenkovic | B60K 35/00 |
| 2020/0154629 A1* | 5/2020 | Holoubek | A01C 7/102 |
| 2020/0204944 A1* | 6/2020 | Tippery | H04L 12/1845 |
| 2022/0019231 A1* | 1/2022 | Birger | A01M 7/0089 |

FOREIGN PATENT DOCUMENTS

| | | |
|---|---|---|
| EP | 2532220 B1 | 3/2014 |
| EP | 2992748 B1 | 12/2017 |

* cited by examiner

METHODS AND APPARATUS TO CONTROL AGRICULTURAL APPLICATION RATES

FIELD OF THE DISCLOSURE

This disclosure relates generally to agricultural product application, and, more particularly, to methods and apparatus to control agricultural application rates.

BACKGROUND

Several general operations are required to develop and maintain a crop farming field. Depending on the crop, farming culture, agricultural vehicles, such as irrigation systems and/or tractors with implements, also referred to herein as applicators, such as sprayers and/or other various types of specialized application equipment, perform common operations such as cultivating, seeding, fertilizing, harvesting, and/or chemical treatment. The applicators typically are associated with a set of tools to perform such operations.

SUMMARY

An example system to control agricultural application rates includes a field area processor to determine an area of a field to be covered during an application session, and an application rate processor including an end product processor to determine an amount of product to be utilized during the application session, the amount of product to be utilized based on an amount of product on a vehicle and a final product amount, and an application rate calculator to determine a first application rate to be implemented by an applicator based on the amount of product to be utilized and the area of the field to be covered.

Figure 1:
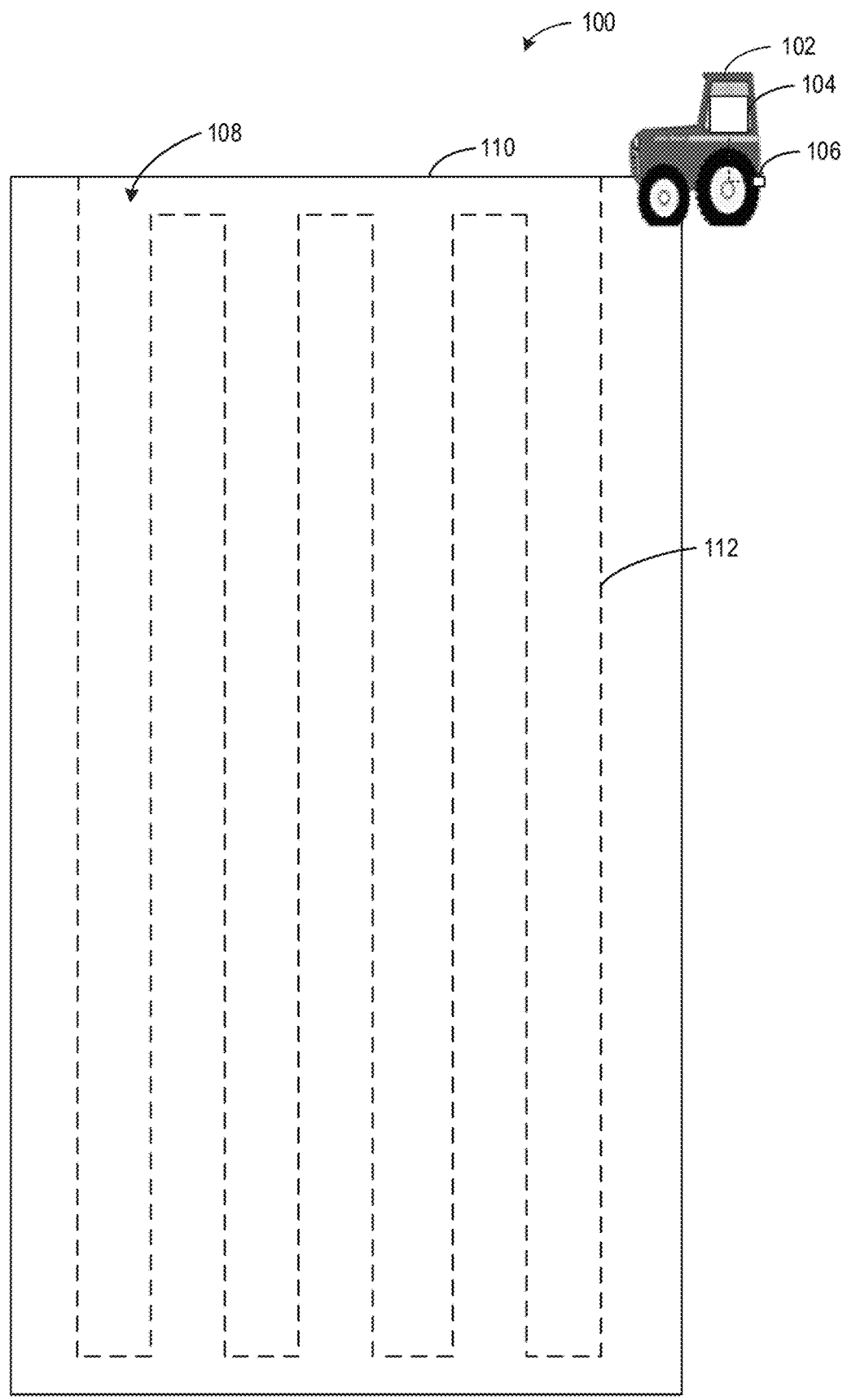
FIG. 1 illustrates a first field to be covered by an applicator communicatively coupled to an example application rate control system.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Methods and apparatus to control agricultural application rates are disclosed herein. Precise and accurate application rates to apply products (e.g., fertilizer, pesticides, seeds, etc.) and/or harvest crops is desirable for equipment operators, such as farmers, to manage a field efficiently and effectively. The effectiveness of applying product over a field can greatly impact the quality of the soil within the field as well as the quantity and quality of crops that the field produces. Efficiently applying products to and/or harvesting crops from a field allows the equipment operator to quickly move on to a subsequent field and/or perform other necessary tasks in a timely manner.

Conventional methods to apply products and/or harvest crops typically rely on the equipment operator to control an application rate (e.g., a rate of applying product and/or harvesting crops) implemented by an applicator on an agricultural vehicle, such as a spray truck or a tractor, for example. The equipment operator begins with a known amount of product and some understanding of the field to be covered.

However, an initial estimation of the application rate can often be inaccurate. For instance, the equipment operator is unable to predict inefficiencies of the application process while covering the field during an application session (e.g., a session of applying products to a field, a session of harvesting crops from a field, etc.). As such, the equipment operator may cover a significant portion of the field using a predetermined application rate before realizing that there is not enough product for the applicator to sufficiently cover a remainder of the field.

In some known instances, the equipment operator covers the remainder of the field with an application rate that is altered (e.g., reduced or increased) compared to the predetermined application rate. In some such instances, crops produced by the field may suffer in quantity or quality. In some other instances, the equipment operator returns to a storage facility to reload the vehicle with additional product. However, a trip to the storage facility may take a significant amount of time, which reduces efficiency of the application session and limits availability of the equipment operator to perform other necessary tasks. The problem is amplified when a farm spans across a large geographical area as it is not practical to return to the storage facility for additional material to cover the remainder of each field.

In some known instances, the applicator covers a field or a significant portion thereof before the machine operator realizes there is or will be product remaining after the field is covered. In such instances, the excess product on the vehicle prevents the machine operator from moving on to a subsequent task in a timely manner as the remaining product has to be brought to the next field, disposed of, or returned to the storage facility. Further, the covered area of the field has received less product than was originally intended, which impacts the soil in the field and/or the crops that the field produces. As a result, there is a burden on the machine operator to constantly adjust application rates in an effort to cover a field accurately and precisely. Further, machine operators often cannot anticipate whether the current application rate will end up with too little or too much product until nearing completion of the application session.

In some situations, an amount of product on the vehicle and a dispensing rate of the product is estimated. In some such applications, a desired end point or location on the field is obtained and a time to reach the end point is estimated based on a current speed of the vehicle. Further, the dispensing rate may be adjusted in an attempt to exhaust the product at the desired end point. However, with such requirements, product is dispensed across at least a portion of the field to estimate and/or adjust the dispensing rate of the product. As a result, the field and/or portions thereof receive an amount of product that deviates from a desired or predetermined amount that provides protection and/or nutrition to substances of the field. As such, the insufficient nutrition and/or protection for areas of the field impacts the crops that the field produces despite the product being exhausted at the end point. Further, the application can be susceptible to running out of product prior to the end point as any deviation from the predetermined path and/or the current speed of the vehicle affects the estimated time to the end point. Additionally, such deviations are likely to occur with imperfections in the field (e.g., elevation changes, irregularly shaped boundaries, etc.), the vehicle (e.g., speed variance, application rate variance, etc.), and/or the route (e.g., deviance from the path, overlap areas, etc.).

Example methods and apparatus disclosed herein control agricultural application rates to cover fields efficiently and effectively with a desired amount of product. Example methods and apparatus disclosed herein provide a system to precisely control agricultural application rates (e.g., a rate control system). The rate control system dynamically calculates a rate at which an applicator is to distribute product to, or collect product from, a field (e.g., an application rate) to prevent any area of the field from being neglected and/or malnourished as a result of an insufficient amount of product from being applied thereto, and/or collected therefrom. The rate control system determines characteristics associated with the field and/or the applicator to determine an initial application rate. Further, the rate control system provides iterative adjustments to the application rate as necessary during an application session (i.e., while covering the field) to address the inefficiencies that may occur while distributing and/or harvesting products.

In disclosed examples, the rate control system calculates an initial application rate based on the field that is being covered. For example, a machine operator can trace a boundary of the field with the agricultural vehicle, which allows the rate control system to determine an area of the field, and optionally generate a guidance path for the vehicle to follow when covering the field. The rate control system generates the guidance path based on the boundary of the field, the area of the field, travel characteristics associated with the vehicle (e.g., a turn radius), and/or application characteristics associated with an applicator covering the field. The application characteristics associated with the applicator can include a coverage area and/or width of the applicator, a range of application rates the applicator can implement, and/or a granular control capability of the applicator. Specifically, the granular control capability of the applicator corresponds to a distribution of components or parts of the applicator at which the application rate can be controlled. For example, some applicators can implement a first application rate at a first nozzle and/or section of nozzles while implementing a second application rate at a second nozzle and/or section of nozzles.

In some examples, the rate control system determines an overlap factor and/or application inefficiencies that may occur when covering the field, which allows the rate control system to determine and/or adjust the application rate accordingly. During the application session and/or in response to the application session being complete, the rate control system stores properties and/or characteristics associated with the application session (e.g., a location and/or dimensions of the field, travel paths, application rate(s), etc.) for reference in subsequent application sessions. As a result, the rate control system can determine characteristics of the field and/or the initial application rate upon arrival at the field for a subsequent application session.

During the application session, the rate control system determines an area and/or portion of the field that the applicator has covered (e.g., a covered field area). In some examples, the rate control system determines a remaining area of the field to be covered in response to the field being partially covered. For example, the rate control system can determine the remaining field area to be covered based on the area of the field and the covered area of the field. In some examples, the rate control system determines whether the current application rate will result in a predetermined final product amount at the end of the application session based on a remaining amount of product to be utilized during the application session and the remaining field area. For example, the rate control system can determine a second application rate based on the remaining amount of product to be utilized and the remaining area of the field. Further, the rate control system can compare the second application rate to the current application rate. Accordingly, the rate control system can implement and/or display the second application rate in response to the second application rate being different from the current application rate. Further, the rate control system continues monitoring for adjustments to the application rate until the field is covered.

FIG. 1 illustrates a first application session 100 including a first field 108 to be covered by an agricultural vehicle 102. In the illustrated example of FIG. 1, the agricultural vehicle 102 includes an applicator (e.g., a seed drill, a fertilizer applicator, a pesticide applicator, a crop harvester, a mobile irrigation system, etc.) 106 operatively coupled to a rate control system 104. For example, the rate control system 104 can be operatively coupled to an actuator of the applicator 106 to control an application rate provided by the applicator 106. Although examples disclosed herein implement the rate control system 104 on the agricultural vehicle 102, the rate control system 104 can be located at a facility where the application session 100 does not take place.

In FIG. 1, the rate control system 104 determines application characteristics associated with the applicator 106, such as an area and/or width covered by the applicator 106, a range of application rates that the applicator 106 can implement, and/or a granular control capability of the applicator 106, based on a make and/or model of the applicator 106 and/or the agricultural vehicle 102. In some examples, the rate control system 104 determines the application characteristics associated with the applicator based on an input from an operator of the agricultural vehicle 102.

In FIG. 1, the agricultural vehicle 102 rides along a boundary (e.g., a perimeter, a border, an edge, etc.) 110 of the field 108, which allows the rate control system 104 to determine a shape and dimensions (e.g., a geometry) of the boundary 110. In some examples, the operator of the agricultural vehicle 102 configures the applicator 106 to apply or collect product while the agricultural vehicle 102 rides along the boundary 110. In some such examples, the rate control system 104 determines that the applicator 106 is applying product while the boundary 110 is being determined and tracks the area of the field 108 being covered.

In FIG. 1, the rate control system 104 can calculate an area of the field 108 to be covered based on the determined geometry of the boundary 110 and the area covered by the applicator 106 in response to the applicator 106 dispensing or collecting product as the rate control system 104 determines the boundary 110. In some examples, the operator configures the agricultural vehicle 102 to follow the boundary without the applicator 106 applying or collecting product. In some such examples, the rate control system 104 determines the area of the field 108 based on the determined geometry of the boundary 110. In some examples, the operator indicates the boundary 110 to a map presented by a user interface via a Global Positioning System (GPS) of the rate control system 104. In some such examples, the rate control system 104 determines the area of the field 108 based on the indicated boundary 110.

In FIG. 1, the rate control system 104 generates a guidance grid (e.g., a guidance path for the agricultural vehicle 102) 112 based on the boundary 110 of the field 108, a previous (i.e., a reference) application session, the application characteristics associated with the applicator 106, travel characteristics of the agricultural vehicle 102, and/or an indication from the operator of the agricultural vehicle 102. In some examples, the rate control system 104 determines the guidance grid 112 based on a path the agricultural vehicle 102 followed during the reference application session. For example, the rate control system 104 can generate the guidance grid 112 to be the path from the reference application session and/or incorporate adjustments thereto. In some examples, the rate control system 104 determines adjustments to the guidance grid 112 based on an indication from the operator of the agricultural vehicle 102. In such examples, the rate control system 104 implements and/or adjusts the guidance grid 112 or a portion thereof based on an indication from the operator of the agricultural vehicle 102 in advance of and/or during the application 100. The rate control system 104 tracks the area covered by the applicator 106, which enables the operator of the agricultural vehicle 102 to choose whether or not to follow the guidance grid 112. In some examples, the rate control system 104 enables the operator to decide whether the rate control system 104 is to generate and/or display the guidance grid 112. In FIG. 1, the rate control system 104 determines an area of the field 108 that may be overlapped by the applicator 106 and/or an inefficiency associated with the application session 100 based on the guidance grid 112 and/or the application characteristics associated with the applicator 106.

In FIG. 1, the rate control system 104 determines an amount of product on the agricultural vehicle 102 for the application session 100. In FIG. 1, the rate control system 104 determines a final product amount to remain on the agricultural vehicle 102 after completion of the application session 100 based on an input from the operator of the agricultural vehicle 102. In some examples, in the absence of the input from the operator, the rate control system 104 determines that the final product amount is to be equivalent to a full capacity of the agricultural vehicle 102 in response to the applicator 106 collecting product (e.g., when the applicator 106 is a harvester) and/or the final product amount is to be zero (e.g., 0.0 gallons, 0.0 ounces, etc.) in response to the applicator 106 distributing product (e.g., when the applicator 106 is a seed drill, a fertilizer applicator, a pesticide applicator, etc.). The rate control system 104 determines an amount of product to be utilized during the application session 100 based on the determined amount of product on the agricultural vehicle 102 and the final product amount.

In FIG. 1, the rate control system 104 calculates an initial application rate (e.g., a first application rate, a product distribution rate, a product collection rate, etc.) to be implemented by the applicator 106 based on the area of the field 108 to be covered, the amount of product to be utilized during the application session 100, the guidance grid 112, the application characteristics associated with the applicator 106, and/or the inefficiency associated with the application session 100. In some examples, the rate control system 104 determines the initial application rate to be implemented by the applicator 106 based on the area of the field 108 to be covered and the determined amount of product to be utilized. In such examples, the rate control system 104 determines an inefficiency of the application session 100 as the applicator 106 covers the field 108.

In some examples, the rate control system 104 is an active system that controls the application rate implemented by the applicator 106. In some examples, the rate control system 104 is a passive system that presents the calculated application rate to the operator of the agricultural vehicle 102, which enables the operator to control the application rate implemented by the applicator 106.

In FIG. 1, the rate control system 104 monitors a location of the agricultural vehicle 102 and, thus, a speed of the agricultural vehicle 102. In turn, the rate control system can determine an area of the field 108 covered by the applicator 106 based the coverage of the applicator 106 and the monitored location of the agricultural vehicle 102. Further, the rate control system 104 can calculate a remaining field area to be covered based on the area of the field 108 and the area of the field 108 covered by the applicator 106.

In FIG. 1, the rate control system 104 senses and/or otherwise determines an amount of product on the vehicle 102. In some examples, the rate control system 104 determines the application rate being implemented by the applicator 106 based on a change in the amount of product on the vehicle 102 over time. In some examples, the rate control system 104 determines whether the application rate over the remaining area of the field 108 will result in the determined end product amount when the application session is complete based on the application rate, the amount of product on the vehicle 102, and the remaining area of the field. Further, the rate control system 104 can adjust the application rate based on the remaining area of the field 108 to be covered and the amount of product on the vehicle 102 in response to the current application rate not resulting in the determined final product amount.

In some examples, the rate control system 104 determines an expected amount of product on the vehicle 102 based on the remaining field area to be covered. In such examples, the rate control system 104 compares the amount of product on the vehicle 102 to the expected amount of product on the vehicle 102. Further, the rate control system 104 can adjust the application rate based on the amount of product on the vehicle 102 and the expected product amount.

In some examples, the operator of the vehicle 102 activates the rate control system 104 during the application session. In such examples, the operator indicates a covered area of the field to the rate control system 104. In turn, the rate control system 104 can determine the application rate based on the remaining area of the field and the remaining amount of product on the vehicle.

In some examples, the rate control system 104 stores the characteristics associated with the field 108 (e.g., the boundary, the area, the location, the path followed by the agricultural vehicle 102, the inefficiency, etc.) and/or the application rate(s) implemented during the application session in an application database. In some such examples, the application database links the application rate with a section of the field 108 based on when and/or where the application rate is adjusted. In FIG. 1, the rate control system 104 dynamically monitors, adjusts, and stores the application rate(s) implemented by the applicator 106 as necessary until the field 108 is covered and the vehicle 102 has the determined end product amount stored thereon.

Figure 2:
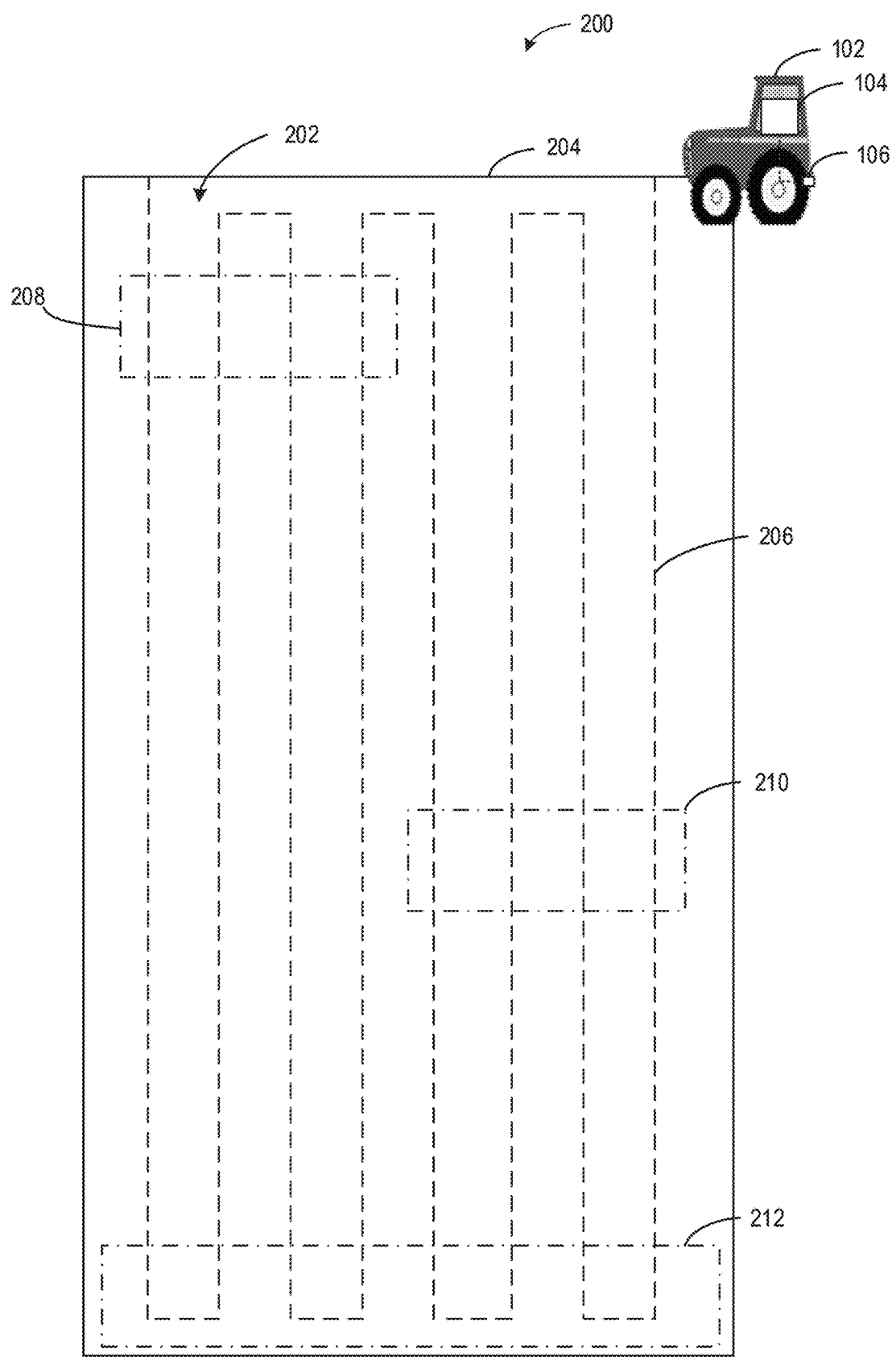
FIG. 2 illustrates a second field including variable rate zones to be covered by an applicator communicatively coupled to the example application rate control system of FIG. 1.

FIG. 2 illustrates a second application session 200 including a second field 202 to be covered by the agricultural vehicle 102. In FIG. 2, the agricultural vehicle 102 includes the rate control system 104 and the applicator 106 of FIG. 1. In the illustrated example of FIG. 2, the field 202 includes a border 204 and a guidance grid 206 generated by the rate control system 104 in response to the agricultural vehicle 102 traveling along the border 204. In FIG. 2, the rate control system 104 calculates an area of the field 202 based on the border 204. In FIG. 2, the field 202 further includes a first rate zone 208, a second rate zone 210, and a third rate zone 212. In FIG. 2, the first rate zone 208, the second rate zone 210, and the third rate zone 212 indicate a prescription for the second field 202.

In the illustrated example of FIG. 2, the first, second, and third rate zones (e.g., rate management zones, prescription zones) 208, 210, 212 receive different application rates compared to a remainder of the field 202. For example, the first, second, and third rate zones 208, 210, 212 include a characteristic(s) that differs from the rest of the field 202 causing a necessitation of more, or less, product compared to the rest of the field 202. That is, the rate zones 208, 210, 212 may be in a perennially wet area, an area of different elevation compared to the remainder of the field 202, and/or an area that includes any other distinguishing factor that impacts a production of crops therein, such as a soil quality, an area affected by a storm, etc.

In the illustrated example of FIG. 2, the operator of the agricultural vehicle 102 indicates the rate zones 208, 210, 212 to a user interface (e.g., a display) of the rate control system 104. For example, the rate control system 104 can present a map of the field 202 to the user interface in response to the agricultural vehicle tracing the border 204 of the field 202 and/or the operator indicating a boundary of the field 202. In some examples, the user interface presents a map of an area where the agricultural vehicle 102 is located via a GPS associated with the rate control system 104. Further, the operator can utilize the map of the field 202 at the user interface to indicate areas of the field 202 that are the rate zones 208, 210, 212. In FIG. 2, the operator highlights, scales, and/or otherwise selects the location(s) of the field 202 representative of the rate zones 208, 210, 212 via the user interface of the rate control system 104. In FIG. 2, the rate control system 104 determines an area(s) of the rate zones 208, 210, 212 via the GPS in response to the operator selecting the location(s) of the rate zones 208, 210, 212.

In FIG. 2, when the rate control system 104 receives the areas associated with the rate zones 208, 210, 212, the operator further inputs a rate multiplier, an offset from an application rate value associated with the rest of the field, and/or a distinct application rate value associated with the first, second, and third rate zones 208, 210, 212, respectively, compared to the rest of the field 202. In some examples, the first rate zone 208 includes a first rate multiplier (e.g., 0.8×), the second rate zone 210 includes a second rate multiplier (e.g., 1.3×), and the third rate zone 212 includes a third rate multiplier (e.g., 2.1×).

In FIG. 2, the rate control system 104 determines an application rate to be implemented by the applicator 106 based on the area of the field 202, the areas of the rate zones 208, 210, 212, the rate multipliers or application rates associated with the rate zones 208, 210, 212, a determined starting product amount on the agricultural vehicle 102, and a determined final product amount to be remaining on the agricultural vehicle 102 after completion of the application session 200. The rate control system 104 determines a location of the agricultural vehicle 102 during the application session 200 via the GPS of the rate control system 104. As such, the rate control system 104 can adjust the application rate based on the location of the agricultural vehicle 102. For example, the rate control system 104 can determine that the agricultural vehicle 102 is in one of the rate zones 208, 210, 212 and adjust the application rate based on the rate multiplier and/or application rate value associated with the rate zone 208, 210, 212. Although examples disclosed herein are described with reference to the location of the agricultural vehicle 102, it should be understood that examples disclosed herein can be implemented based on locations of distinct parts and/or working elements of the agricultural vehicle 102. For examples, the location of the agricultural vehicle 102 can be indicative of locations of nozzles and/or sections of nozzles associated with the applicator 106, which can implement distinct application rates.

In FIG. 2, the rate control system 104 stores the characteristics of the field 202 including the locations, areas, and application rates or rate multipliers of the rate zones 208, 210, 212 in a field database. As a result, the rate control system 104 can identify the rate zones 208, 210, 212 of the field 202 for a subsequent application session without an indication of the rate zones 208, 210, 212 from the operator of the agricultural vehicle 102.

Figure 3:
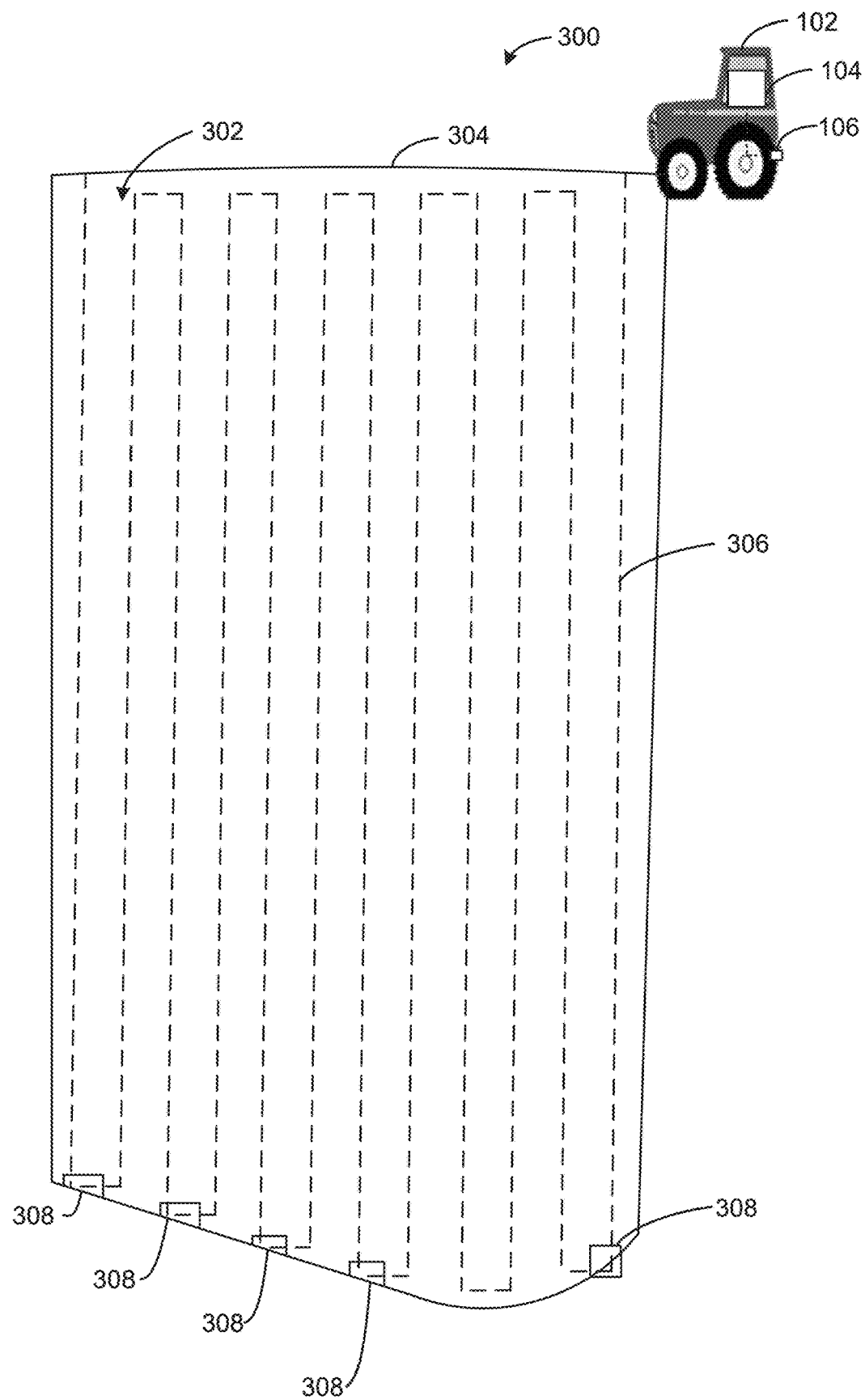
FIG. 3 illustrates a third field including an irregular area to be covered by an applicator communicatively coupled to the example application rate control system of FIGS. 1 and/or 2.

FIG. 3 illustrates a third application session 300 including a third field 302 to be covered by the agricultural vehicle 102. In FIG. 3, the field 302 includes an irregularly shaped area to be covered by the applicator 106. In FIG. 3, the agricultural vehicle 102 rides along a perimeter 304 of the field 302, which enables the rate control system 104 to determine an area of the field 302 and, optionally, a guidance grid 306 for the application session 300.

In the illustrated example of FIG. 3, the rate control system 104 determines inefficient areas (e.g., areas of overlap, areas associated with reduced coverage speed, etc.) 308 based on the irregularly shaped area of the field 302, the determined guidance grid 306, and/or the application characteristics associated with the applicator 106. That is, the rate control system 104 determines areas where the applicator 106 will overlap and/or be less efficient during the application session 300 (e.g., the inefficient areas 308). As such, the rate control system 104 can determine the application rate to be implemented by the applicator 106 during the session 300 based on the inefficient areas 308.

In some examples, the rate control system 104 determines the inefficient areas 308 based on a configuration of the agricultural vehicle 102 and the associated applicator 106, which are utilized to determine the guidance grid 306. For example, the inefficient areas 308 can be a result of travel characteristics (e.g., a turn radius) of the agricultural vehicle 102, a quantity of rows, sections, nozzles, etc. on the applicator 106, and an ability to granularly control the applicator 106, in addition to the geometry of the field 302. In some examples, the rate control system 104 determines the inefficient areas 308 during the application session 300. For example, the rate control system 104 can determine an area of the field 302 that the applicator 106 overlaps and/or where a speed of the agricultural vehicle 102 is reduced during the application session 300.

In FIG. 3, the inefficient areas 308 are a result of irregular geometry (e.g., curvature) along the perimeter 304 of the field 302. Specifically, the curvature along the perimeter 304 causes the applicator 106 to exit the field 302 and/or overlap certain areas of the field 302 (the inefficient areas 308) as the agricultural vehicle 102 makes a turn and/or maneuvers to cover an entirety of the field 302 during the application session 300. In FIG. 3, the applicator 106 covered an area along the perimeter 304 of the field 302 initially so overlapping areas near the perimeter (the inefficient areas 308) results in an inefficient application of product. In some examples, the inefficient areas 308 are a result of wetlands that affect a maneuverability of the agricultural vehicle 102. Although examples disclosed herein show inefficient areas along the perimeter 304 of the field 302, it should be understood that the inefficient areas 308 can occur anywhere on the field 302.

Figure 4:
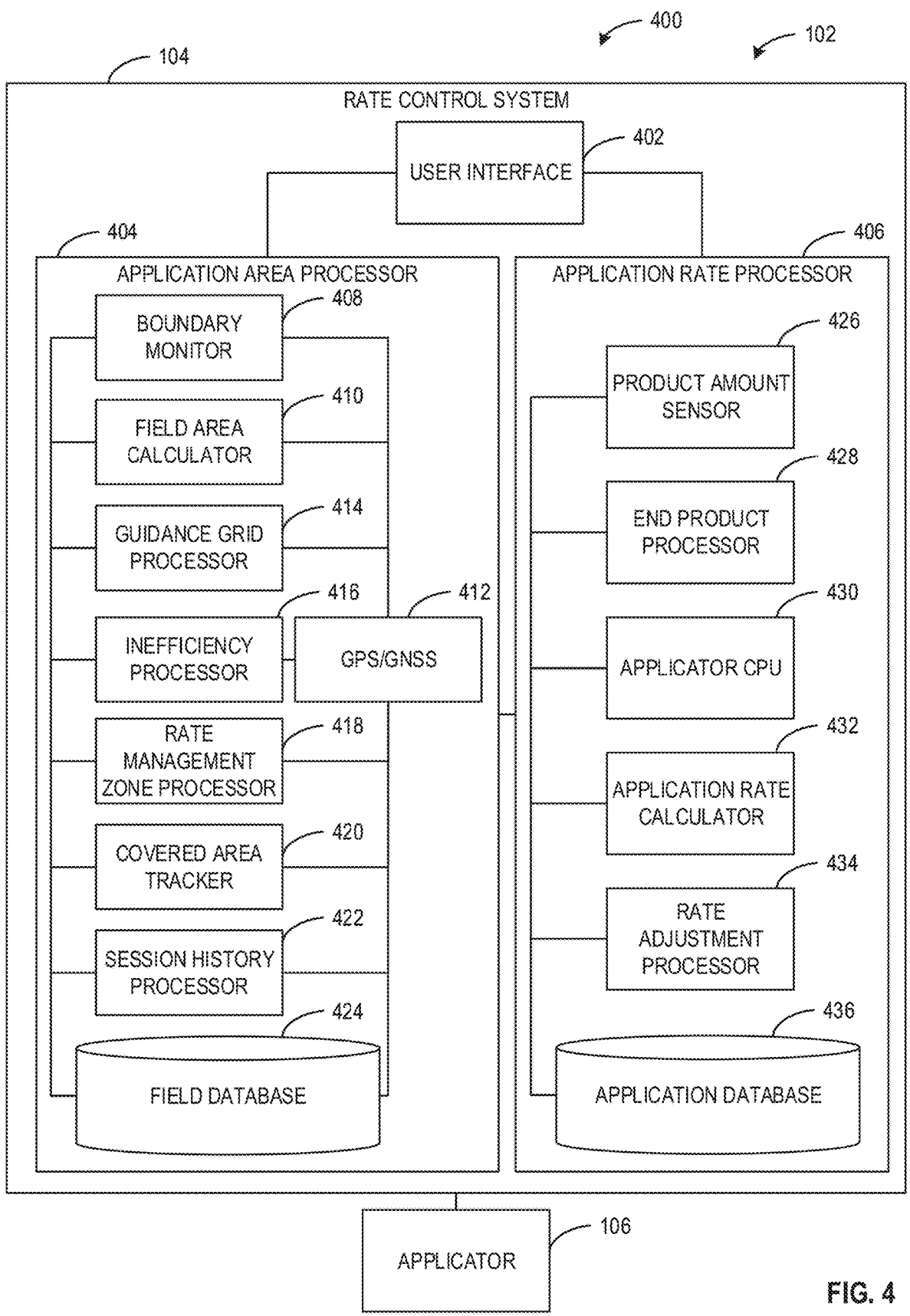
FIG. 4 is a block diagram of the example application rate control system of FIGS. 1, 2, and/or 3.

FIG. 4 is a block diagram 400 of the rate control system 104 operatively coupled to the applicator 106 of the agricultural vehicle 102 of FIGS. 1, 2, and/or 3. In the illustrated example of FIG. 4, the rate control system includes a user interface 402, an application area processor 404, and an application rate processor 406. In FIG. 4, the application area processor 404 includes a boundary monitor 408, a field area calculator 410, a global positioning system (GPS) and/or a Global Navigation Satellite System (GNSS) 412, a guidance grid processor 414, an inefficiency processor 416, a rate management zone processor 418, a covered area tracker 420, a session history processor 422, and a field database 424. In FIG. 4, the application rate processor 406 includes a product amount sensor 426, an end product processor 428, an applicator central processing unit (CPU) 430, an application rate calculator 432, a rate adjustment processor 434, and an application database 436.

In FIG. 4, the user interface 402, the application area processor 404, and the application rate processor 406 are communicatively coupled. In FIG. 4, the boundary monitor 408, the field area calculator 410, the GPS/GNSS 412, the guidance grid processor 414, the inefficiency processor 416, the rate management zone processor 418, the covered area tracker 420, the session history processor 422, and the field database 424 are communicatively coupled. In FIG. 4, the end product processor 428, the applicator CPU 430, the application rate calculator 432, the product amount sensor 426, the rate adjustment processor 434, and the application database 436 are communicatively coupled.

In FIG. 4, an operator (e.g., a user, an operator of the agricultural vehicle 102) activates the rate control system 104 during or in advance of an application session (e.g., the first, second, and/or third application session 100, 200, 300) via the user interface 402. In FIG. 4, the user interface 402 receives a final product amount to be remaining after the application session from the operator. Typically, the desired end product amount is zero, but in some cases the operator retains a certain amount of product on the agricultural vehicle 102 if it includes more product than a field (e.g., the first, second, and/or third field 108, 202, 302) generally utilizes and/or if the operator plans to utilize the product across more than one field.

In some examples, the user interface 402 obtains characteristics associated with the agricultural vehicle 102 and/or the applicator 106 from the operator. For example, the user interface 402 can receive a make and/or a model of the agricultural vehicle 102 and/or the applicator 106, which can be indicative of travel characteristics associated with the agricultural vehicle 102 and/or application characteristics associated with the applicator 106. In some examples, such characteristics are known by the applicator CPU 430 and the rate control system 104 proceeds without the user interface 402 obtaining such characteristics. Further, the user interface 402 can present a map including the location of the agricultural vehicle 102 to the operator via the GPS/GNSS 412, which enables the operator to indicate characteristics associated with the field, such as a location, a boundary, and/or rate management zones (e.g., the first, second, and third rate zones 208, 210, 212) associated with the field. Further, the user interface 402 can prompt the operator to indicate application rate values and/or rate multipliers associated with the rate management zones.

In FIG. 4, the user interface 402 receives an indication from the operator that the agricultural vehicle 102 is following a perimeter of the field. In such examples, the user interface 402 provides a signal indicative of the agricultural vehicle 102 following the perimeter of the field to the application area processor 404. In some examples, the user interface 402 presents a prompt to the operator to determine whether a guidance path is to be generated for the application session. In such examples, the user interface 402 indicates whether the guidance path is to be generated to the application area processor 404 based on a response of the operator to the prompt.

In FIG. 4, in response to identifying the field, the application area processor 404 presents the map of the field to the operator via the user interface 402. In some examples, the user interface 402 identifies any rate management areas on the field in response to the operator indicating a location and/or area of the rate management areas on the map of the field. Further, the operator can indicate application rate value associated with the rate management areas to the rate control system 104 via the user interface 402. In some examples, the user interface 402 transmits the rate management areas, the associated application rate values, and an identifier associated with each rate management area, and/or adjustments to the guidance path associated with the application session to the application area processor 404 and/or the application rate processor 406.

In some examples, the user interface 402 receives the guidance path in response to the application area processor 404 generating the guidance path for the application session. In some examples, the user interface 402 presents the guidance path for the application session with the map of the field. In some examples, the operator can update the guidance path or a portion thereof during and/or in advance of the application session via the user interface 402. In such examples, the user interface 402 can transmit the updated guidance path to the application area processor 404 and/or the application rate processor 406. In some other examples, the user interface 402 enables the operator to hide the guidance path.

In some examples, when the agricultural vehicle 102 is at or nearby a field that has previously been covered using the rate control system 104, the user interface 402 presents a prompt to the operator to determine whether data from the field database 424 and/or the application database 436 is to be utilized for the instant application session. For example, the rate control system 104 can utilize data that was collected during a previous (e.g., a reference) application session that covered the same field. In some examples, in response to utilizing data from the previous application session, the application rate processor 406 identifies the previously utilized application rate(s) and/or determines an updated application rate based on adjustments to the application rate(s) of the reference application session. In some examples, the rate control system 104 indicates the previously determined application rate and/or any adjustments thereto to the applicator 106. In some other examples, the application rate processor 406 indicates the application rate(s) to the user interface 402, which enables the operator to control the applicator 106 accordingly.

In FIG. 4, the application area processor 404 determines an area of the field to be covered during the application session. In some examples, the application area processor 404 determines the area of the field based on the boundary of the field. In FIG. 4, the application area processor 404 determines characteristics associated with the field to be covered, such as the guidance grid, an application inefficiency, and/or the rate management zones. In some examples, the application area processor 404 determines the guidance grid and/or the application inefficiency based on application characteristics associated with the applicator 106 and/or a maneuverability of the agricultural vehicle 102. In some examples, the application area processor 404 transmits the guidance grid to the user interface 402 in response to determining the guidance grid. Further, the application area processor 404 can receive an adjustment to the guidance grid via the user interface 402.

In some examples, the application area processor 404 determines a covered area of the field during the application session. In such examples, the application area processor 404 determines a remaining area of the field to be covered based on the area of the field and the covered area of the field. In FIG. 4, the application area processor 404 indicates the area of the field, the characteristics associated with the field, and/or the remaining area of the field to the application rate processor 406.

In FIG. 4, the application area processor 404 stores the area and/or characteristics associated with field in response to completing the application session. In some examples, the application area processor 404 stores locations within the field associated with changes in the application rate determined by the application rate processor 406 and/or implemented by the applicator 106. In some examples, the application area processor 404 utilizes the stored area and/or characteristics associated with the field for subsequent application sessions.

In FIG. 4, the application rate processor 406 determines an application rate to be utilized during the application session. In some examples, the application rate processor 406 determines application characteristics associated with the applicator 106, such as a coverage area of the applicator 106, a granular control capability of the applicator 106, a range of application rates that the applicator 106 can implement, and/or an application rate being implemented by the applicator 106. In some examples, the application rate processor 406 indicates the coverage of the applicator 106 and/or the granular control capability of the applicator 106 to the application area processor 404.

In FIG. 4, the application rate processor 406 determines an amount of product on the agricultural vehicle 102 and/or an amount of product to be remaining on the agricultural vehicle 102 after completing the application session (e.g., an end product amount. In such examples, the application rate processor 406 determines an amount of product to be utilized during the application based on the amount of product on the vehicle and the end product amount. In some examples, the application rate processor 406 determines an application rate to be utilized during the application session based on the amount of product to be utilized during the application session, the area of the field, the remaining area of the field, the characteristics associated with the field, and/or the application characteristics associated with the applicator 106. In some examples, the application rate processor 406 stores application rates utilized during the application session. In some examples, the application rate processor 406 provides an indication to the application area processor 404 in response to determining and/or implementing a change in the application rate. In some examples, the application rate processor 406 identifies the applications rates utilized for the application session when performing subsequent application sessions at the same field.

In FIG. 4, the GPS/GNSS 412 tracks a location of the vehicle 102 in response to the rate control system 104 activating. In some examples, the GPS/GNSS 412 transmits a map of an area surrounding the vehicle 102, which can include the field, to the user interface 402. In some examples, the GPS/GNSS 412 receives the location of the field, the boundary of the field, and/or rate management zones associated with the field from the operator via the user interface 402. In such examples, the GPS/GNSS 412 indicates the location of the rate management zones to the rate management zone processor 418. In some examples, the GPS/GNSS 412 continuously or periodically indicates the location of the agricultural vehicle 102 to the boundary monitor 408, the field area calculator 410, the guidance grid processor 414, the inefficiency processor 416, the rate management zone processor 418, the covered area tracker 420, the session history processor 422, and/or the field database 424.

In FIG. 4, the boundary monitor 408 tracks a location and, in turn, a path of the agricultural vehicle 102 via the GPS/GNSS 412. In some examples, the boundary monitor 408 tracks a location of the agricultural vehicle 102 in response to the rate control system 104 being activated. In some examples, the boundary monitor 408 tracks the location of the agricultural vehicle 102 in response to the application area processor 404 receiving the signal indicative of the agricultural vehicle 102 following the perimeter of the field.

In FIG. 4, the boundary monitor 408 determines a boundary of the field (e.g., a perimeter of the field, a geometry of the field, etc.) in response to returning to the approximate location where tracking began and/or enclosing an area of the field. In some examples, the boundary monitor 408 determines the boundary of the field in response to the operator indicating the boundary to the map presented via the user interface 402. In some examples, the boundary monitor 408 receives the boundary associated with the field based on a previous application session via the session history processor 422. In some examples, the boundary monitor 408 associates the determined boundary of the field with the location of the field via the GPS/GNSS 412. In such examples, the boundary monitor 408 transmits the location and boundary associated with the field to the field area calculator 410, the guidance grid processor 414, the inefficiency processor 416, the rate management zone processor 418, and/or the field database 424.

In FIG. 4, the field area calculator 410 calculates an area of the field in response to the boundary monitor 408 determining the boundary of the field. In some examples, the field area calculator 410 calculates the area of the field based on the boundary of the field. In some examples, the field area calculator 410 indicates the area of the field to the guidance grid processor 414 and/or the rate management zone processor 418. In some examples, the field area calculator 410 stores the area of the field in the field database 424. In some examples, the field area calculator 410 receives the area associated with the field based on a previous application session via the session history processor 422.

In some examples, the machine operator traces the boundary of the field with the applicator 106 without applying the product and/or harvesting crops. In some such examples, the field area calculator 410 incorporates an area covered by the applicator 106 along the boundary traced in the field area calculation. In some other examples, the operator configures the applicator 106 to apply product and/or harvest crops along the boundary of the field while the boundary monitor 408 tracks the perimeter of the field. In some such examples, the field area calculator 410 calculates the area of the field in response to completion of the boundary monitor 408 tracking the perimeter of the field. Further, the covered area tracker 420 can track the area covered along the boundary in response to the applicator 106 dispensing product and/or harvesting crops as the boundary monitor 408 tracks the perimeter of the field.

In FIG. 4, the guidance grid processor 414 determines a guidance path (e.g., a guidance grid) for the agricultural vehicle 102 to follow during the application session based on the determined boundary of the field, the determined area of the field, and/or a previous application session associated with the field. In some examples, the guidance grid processor 414 determines the path for the agricultural vehicle 102 to follow based on travel characteristics associated with the agricultural vehicle 102 and/or application characteristics associated with the applicator 106. In some examples, the guidance grid processor 414 determines and/or updates the guidance grid in response to the application area processor 404 receiving an adjustment to the guidance grid via the user interface 402. In some examples, the guidance grid processor 414 does not generate the guidance grid in response to the application area processor 404 receiving a signal indicative of the operator choosing not to utilize guidance grid.

In FIG. 4, the inefficiency processor 416 determines an application inefficiency associated with the field. For example, the inefficiency processor 416 can determine the application inefficiency based on the boundary of the field, the area of the field, the guidance path for the field, and/or the application characteristics associated with the applicator 106. In some examples, the inefficiency processor 416 calculates an area of the field that will be overlapped by the applicator 106 during the application session based on the field associated with the application session. For example, when the field includes an irregular boundary and/or area, the inefficiency processor 416 identifies areas of the field that will be overlapped based on the determined path for the applicator 106 and the determined area of the field. In some examples, the inefficiency processor 416 determines areas of the field that are overlapped during the application session based on application characteristics associated with the applicator 106. For example, the inefficiency processor 416 can determine the overlapped areas based on an area covered by the applicator 106 and/or a granular control capability of the applicator 106. In some examples, the inefficiency processor 416 transmits the overlap areas of the field and/or the inefficiency of the application session to the field database 424.

In some examples, the inefficiency processor 416 compares a route of the agricultural vehicle 102 to the determined guidance grid. In such examples, the inefficiency processor 416 can determine the inefficiency of the application session based on a difference between the route of the agricultural vehicle 102 and the determined guidance grid. In some examples, the application area processor 404 transmits the determined application inefficiency to the application rate processor 406.

In FIG. 4, the rate management zone processor 418 determines coordinates along a perimeter of the rate management zones via the GPS/GNSS 412. In some examples, the rate management zone processor 418 indicates the determined perimeter of the rate management zones to the field area calculator 410. In some such examples, the field area calculator 410 determines an area of the rate management zones. In some examples, the rate management zone processor 418 transmits the areas of the rate management zones and/or the associated identifiers to the inefficiency processor 416 and/or the field database 424 The application area processor 404 can transmit the areas of the rate management zones and the associated identifiers to the application rate processor 406.

In example operations, the rate management zone processor 418 determines when the applicator 106 is entering and/or exiting a rate management zone based on the determined coordinates of the perimeter of the rate management zone and a location of the agricultural vehicle 102 determined by the GPS/GNSS 412. In some such examples, in response to the agricultural vehicle 102 entering a rate management zone, the application area processor 404 indicates the identifier associated with the rate management zone to the application rate processor 406. In some examples, the application area processor 404 provides an indication to the application rate processor 406 in response to the agricultural vehicle 102 exiting the prescription zone.

In FIG. 4, the covered area tracker 420 tracks an area of the field that has been covered by the applicator 106 during the application session. In some examples, the covered area tracker 420 tracks the covered area of the field in response to the applicator 106 dispensing product and/or harvesting crops. In some examples, the covered area tracker 420 receives a coverage width and/or area of the applicator 106 from the application rate processor 406 and/or the user interface 402. In some examples, the covered area tracker 420 tracks the covered area based on a tracked location of the agricultural vehicle 102 during the application session via the GPS/GNSS 412 and a coverage of the applicator 106. The application area processor 404 transmits the covered area and characteristics associated therewith (e.g., inefficient areas, rate management zones, etc.) to the application rate processor 406. Accordingly, the covered area tracker 420 stores the covered area of the field in the field database 424 in response to completion of the application session. As a result, the field database 424 includes accurate characteristics of the field that can be utilized for subsequent application sessions.

In FIG. 4, the field database 424 stores characteristics associated with fields covered during application sessions. For example, the field database 424 can store the boundary of the field, the area of the field, the guidance path associated with the field, the inefficiency associated with the field, the rate management zones associated with the field, and/or the area of the field covered during the application session. In some examples, the field database 424 stores coordinates of the field associated with the application session and an identification value associated with the field and/or the application session.

In FIG. 4, the session history processor 422 determines whether data and/or characteristics associated with the application session are to be utilized for a subsequent application session at the same field. In some examples, the session history processor 422 determines to utilize the data and/or characteristics associated with the application session in response to the agricultural vehicle 102 arriving at a field where characteristics of a previous (reference) application session have been recorded. For example, the session history processor 422 monitors a location of the agricultural vehicle 102 via the GPS/GNSS 412 and cross-references the identified location with field locations stored in the field database 424. In some examples, the session history processor 422 associates an identification value with the field and/or the application session. In such examples, the application area processor 404 transmits the identification value associated with the field to the application rate processor 406 in response to arriving at the field. The application area processor 404 and/or the application rate processor 406 can transmit data (e.g., field characteristics, an application rate(s), etc.) from the reference session to the user interface 402, which enables the operator to indicate whether the data is to be utilized for the instant application session when the agricultural vehicle 102 arrives at the field.

In FIG. 4, the product amount sensor 426 determines an amount of product on the agricultural vehicle 102 and/or an amount of storage available on the agricultural vehicle 102. In some examples, the product amount sensor 426 includes a scale that measures a weight of the stored product and/or a storage tank that measures a volume of the stored product. In some examples, the product amount sensor 426 generates a trigger in response to the amount of product on the vehicle 102 surpassing (e.g., being greater than, being less than) a predetermined threshold. In some other examples, the application rate processor 406 receives the amount of product and/or available storage on the agricultural vehicle 102 via the user interface 402.

In some examples, the product amount sensor 426 dynamically monitors the amount of product and/or available storage on the agricultural vehicle 102 during the application session. In some examples, the product amount sensor 426 transmits the determined amount of product and/or the available storage on the vehicle 102 to the end product processor 428 and/or the rate adjustment processor 434 periodically (e.g., every 1 second, every 2 seconds, etc.).

In FIG. 4, the end product processor 428 determines a final product amount to be remaining on the agricultural vehicle 102 at completion of the application session. In some examples, the application rate processor 406 receives the final product amount from the operator of the agricultural vehicle 102 via the user interface 402. In some examples, the end product processor 428 analyzes the final product amount and the amount of product and/or available storage on the agricultural vehicle 102. In some such examples, the end product processor 428 determines an amount of product to be utilized (e.g., applied, dispensed, collected, etc.) during the application session or during a remainder of the application session when the application session is in progress. Further, the end product processor 428 can transmit the amount of product to be utilized during the application session or a remainder thereof to the application rate calculator 432 and/or the rate adjustment processor 434.

In FIG. 4, the applicator CPU 430 identifies application characteristics associated with the applicator 106. For example, the applicator CPU 430 can determine an area or width covered by the applicator 106 (e.g., a coverage of the applicator 106), a range of application rates that can be implemented by the applicator 106, a precision of the application rates that can be implemented by the applicator 106, and/or granular control capabilities of the applicator 106. In some examples, the applicator CPU 430 determines the application rate being implemented by the applicator 106. In FIG. 4, the applicator CPU 430 transmits the application characteristics associated with the applicator 106 and/or the application rate being implemented by the applicator 106 to the application rate calculator 432 and/or the rate adjustment processor 434. In some examples, the application rate processor 406 transmits the coverage of the applicator 106 to the application area processor 404.

In some examples, the applicator CPU 430 is external to the rate control system 104 or the rate control system 104 functions without communications from the applicator CPU 430. In some such examples, the user interface 402 obtains the application characteristics associated with the applicator 106 from the operator via the user interface 402. For example, the user interface 402 prompts the operator to input a make and/or model of the applicator 106, which enables the application rate processor 406 to determine the application characteristics associated therewith. In some examples, the user interface 402 receives certain application characteristics associated with the applicator 106, such as a coverage thereof. In such examples, the application area processor 404 and the application rate processor 406 receive the coverage of the applicator 106 via the user interface 402.

In FIG. 4, the application rate calculator 432 calculates the application rate to be implemented by the applicator 106. For example, the application rate calculator 432 can calculate a first application rate based on the amount of product to be utilized during the application session, application characteristics associated with the applicator 106, the area of the field to be covered, the determined application inefficiency, and/or the rate management areas within the field and the associated rate multipliers. In some examples, the application rate calculator 432 dynamically or periodically calculates a second application rate based on the remaining amount of product to be utilized during the application session, the application characteristics associated with the applicator 106, and/or the remaining area of the field to be covered and characteristics associated therewith (e.g., rate management zones, overlap areas, etc.). In some examples, the application rate calculator 432 transmits the calculated application rate to the rate adjustment processor 434 and/or the application database 436. In some examples, the rate control system 104 transmits the application rate calculated by the application rate calculator 432 to the applicator 106, which implements the calculated application rate. In some examples, the rate control system 104 presents the calculated application rate to the operator of the agricultural vehicle 102 via the user interface 402.

In FIG. 4, the rate adjustment processor 434 determines whether the application rate over the remaining area of the field results in the predetermined end product amount indicated by the operator (e.g. 0.0 gallons of product, 10 gallons of product, etc.). In some examples, the rate adjustment processor 434 determines the application rate being implemented by the applicator 106 based on a change in the determined amount of product and/or available storage on the vehicle 102 over time. For example, the rate adjustment processor 434 can compare the first application rate to the second application rate calculated by the application rate calculator 432 to determine if an adjustment is to be made. In turn, the rate adjustment processor 434 can determine the second application rate is to be implemented by the applicator 106 in response to the second application rate being different from the first application rate. As a result, the rate control system 104 can transmit the second application rate to the applicator 106 in response to the second application rate being different from the first application rate.

In some other examples, during the application session, the rate adjustment processor 434 determines whether the application rate over the remaining area of the field will result in a product amount that is different from the final product amount. For example, the rate adjustment processor 434 can analyze the application rate, the remaining amount of product to be utilized, and/or the remaining area of the field including characteristics associated therewith to determine if an adjustment to the application rate is necessary. In some examples, the rate adjustment processor 434 determines an expected amount of product to be remaining on the agricultural vehicle 102 given the remaining area of the field and characteristics associated therewith. In some examples, the rate adjustment processor 434 compares the amount of product on the agricultural vehicle to the expected amount of product. In turn, the application rate calculator 432 recalculates the application rate based on the remaining area of the field, parameters associated with the remaining area of the field (e.g., prescription zone characteristics, overlap factor, etc.) and/or the remaining amount of product to be utilized in response to the expected product amount being different from the amount of product on the agricultural vehicle 102. In some examples, the application rate calculator 432 transmits the calculated application rate to the application database 436 in response to the application rate being recalculated.

In FIG. 4, the rate adjustment processor 434 identifies the application rate values and identifiers associated with the rate management zones in response to the application rate processor 406 receiving the rate multipliers and identifiers associated with the rate management zones from the user interface 402. In some examples, the rate adjustment processor 434 determines to implement an application rate value associated with a rate management zone identifier when the agricultural vehicle 102 enters the rate management zone. For example, application area processor 404 can indicate the identifier associated with the rate management zone that the agricultural vehicle 102 is entering to the application rate processor 406. As such, the rate adjustment processor 434 can determine the application rate associated with the rate management zone identifier. In some examples, the rate adjustment processor 434 transmits a rate multiplier associated with the rate management zone to the application rate calculator 432. In such examples, the application rate calculator 432 calculates the application rate for the rate management zone based on the received rate multiplier. Further, the rate adjustment processor 434 can provide an indication to the application rate calculator 432 to recalculate and/or reset the application rate in response to the application area processor 404 indicating that the agricultural vehicle 102 is exiting the rate management zone.

In FIG. 4, the application database 436 stores the application rates calculated by the application rate calculator 432 during the application session. In some examples, the application database 436 stores the application rates implemented by the applicator 106. In FIG. 4, the application database 436 stores application characteristics associated with certain applicators (e.g., the applicator 106) based on the make and/or model of the applicators.

While an example manner of implementing the rate control system 102 of FIGS. 1, 2, and/or 3 is illustrated in FIG. 4, one or more of the elements, processes and/or devices illustrated in FIG. 4 may be combined, divided, re-arranged, omitted, eliminated and/or implemented in any other way. Further, the example user interface 402, the example application area processor 404 including the example boundary monitor 408, the example field area calculator 410, the example GPS/GNSS 412, the example guidance grid processor 414, the example inefficiency processor 416, the example prescription zone processor 418, the example covered area tracker 420, the example session history processor 422, and the example field database 424, and the example application rate processor 406 including the example end product processor 428, the example applicator CPU 430, the example application rate calculator 432, the example product amount sensor 426, the example rate adjustment processor 434, and the example application database 436 and/or, more generally, the example rate control system 104 of FIGS. 1, 2, and/or 3 may be implemented by hardware, software, firmware and/or any combination of hardware, software and/or firmware. Thus, for example, any of the example user interface 402, the example application area processor 404, the example boundary monitor 408, the example field area calculator 410, the example GPS/GNSS 412, the example guidance grid processor 414, the example inefficiency processor 416, the example prescription zone processor 418, the example covered area tracker 420, the example session history processor 422, the example field database 424, the example application rate processor 406, the example end product processor 428, the example applicator CPU 430, the example application rate calculator 432, the example product amount sensor 426, the example rate adjustment processor 434, and the example application database 436 and/or, more generally, the example rate control system 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 402, the example application area processor 404, the example boundary monitor 408, the example field area calculator 410, the example GPS/GNSS 412, the example guidance grid processor 414, the example inefficiency processor 416, the example prescription zone processor 418, the example covered area tracker 420, the example session history processor 422, the example field database 424, the example application rate processor 406, the example end product processor 428, the example applicator CPU 430, the example application rate calculator 432, the example product amount sensor 426, the example rate adjustment processor 434, and the example application database 436 is/are hereby expressly defined to include a non-transitory computer readable storage device or storage disk such as a memory, a digital versatile disk (DVD), a compact disk (CD), a Blu-ray disk, etc. including the software and/or firmware. Further still, the example rate control system 104 of FIGS. 1, 2, and/or 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
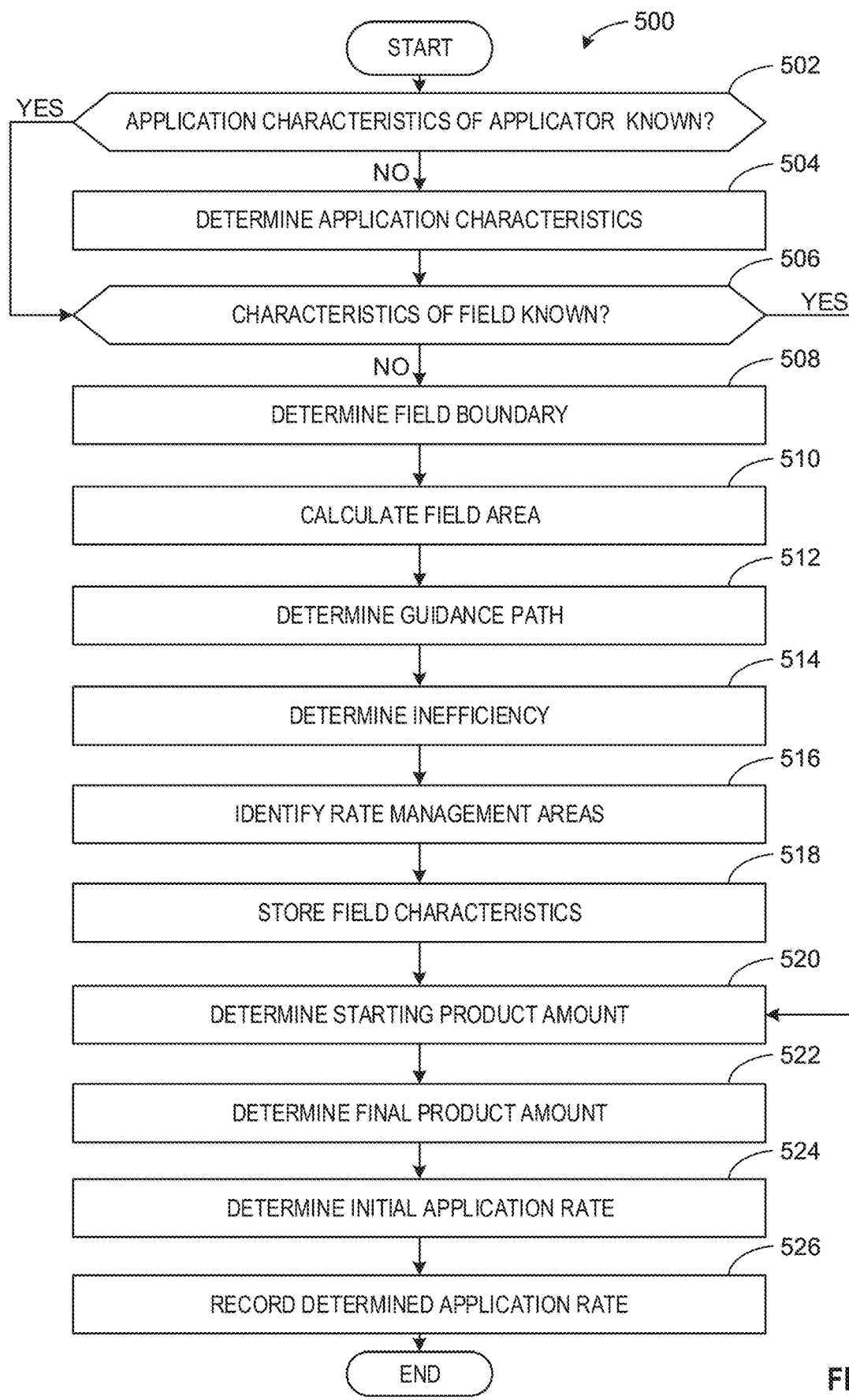
FIG. 5 is a first flowchart representative of machine readable instructions which may be executed to implement the example application rate control system of FIGS. 1, 2, 3, and/or 4 to determine an initial application rate for the first field, the second field, and/or the third field of FIGS. 1, 2, and/or 3.
Figure 6:
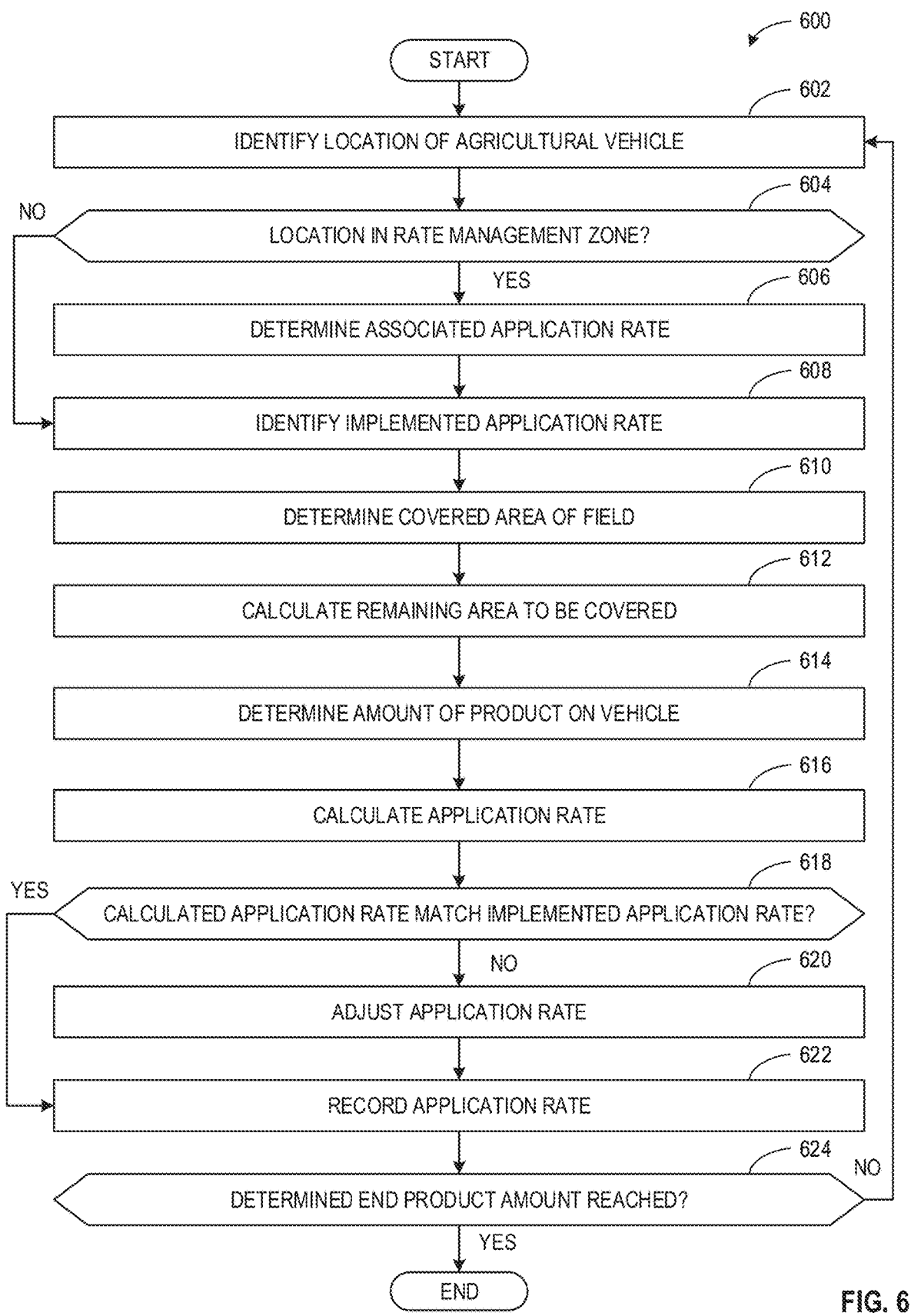
FIG. 6 is a second flowchart representative of machine readable instructions which may be executed to implement the example application rate control system of FIGS. 1, 2, 3, and/or 4 to apply product and determine adjustments to the application rate throughout the first field, the second field, and/or the third field of FIGS. 1, 2, and/or 3.

A flowchart representative of example hardware logic, machine readable instructions, hardware implemented state machines, and/or any combination thereof for implementing the rate control system 104 of FIGS. 1, 2, and/or 3 is shown in FIGS. 5 and 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 5 and 6, many other methods of implementing the example rate control system 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a first flowchart representative of machine readable instructions 500 which may be executed to implement the example rate control system 104 of FIGS. 1, 2, 3, and/or 4 to determine an initial application rate for the first application session 100, the second application session 200, and/or the third application session 300 of FIGS. 1, 2, and/or 3. The example machine readable instructions 500 begin at block 502, at which the rate control system 104 determines whether application characteristics associated with the applicator 106 are known. In some examples, the application rate processor 406 determines whether the coverage area and/or width of the applicator 106, the granular control capabilities of the applicator 106, the range of application rates the applicator 106 can implement, and/or the precision associated with the rates the applicator 106 can implement are known. For example, the end product processor 428 of the application rate processor 406 can identify whether the applicator CPU 430 indicates the coverage and/or the granular control capabilities of the applicator 106. In some examples, the end product processor 428 transmits the identified application characteristics associated with the applicator 106 to the user interface 402 for confirmation. In FIG. 5, in response to the application characteristics associated with the applicator 106 being known by the applicator CPU 430 and/or confirmed at the user interface 402, the machine readable instructions 500 continue to block 506. In FIG. 5, in response to the application characteristics associated with the applicator 106 not being known and/or not being confirmed at the user interface 402, the machine readable instructions 500 proceed to block 504.

At block 504, the rate control system 104 receives the application characteristics associated with the applicator 106. For example, the application area processor 404 and/or the application rate processor 406 can transmit a request for the application characteristics associated with the applicator 106 to the user interface 402 in response to determining that communications with the applicator CPU 430 are non-existent and/or the application characteristics being disputed at the user interface 402. In some examples, the user interface 402 prompts the operator to input the application characteristics associated with the applicator 106 and/or the make and/or model of the applicator 106. In some such examples, the user interface 402 transmits the coverage of the applicator 106 indicated by the operator to the application area processor 404 and/or the application rate processor 406. In some examples, the application database 436 stores types of applicators, by the make and/or model thereof, with the associated application characteristics. In such examples, the rate adjustment processor 434 can identify the application characteristics associated with the applicator 106 via the application database 436 in response to receiving the make and/or model of the applicator 106.

At block 506, the rate control system 104 determines whether characteristics of the field associated with the application session are known. In some examples, the application area processor 404 determines whether characteristics of the field are known based on a previous application session. For example, the session history processor 422 of the application area processor 404 compares a location of the agricultural vehicle 102 identified by the GPS/GNSS 412 to stored locations of fields in the field database 424. When a field stored in the field database 424 matches a location of the agricultural vehicle 102, the application area processor 404 can provide characteristics of the field, such as a defined area of the field, rate management zones associated with the field, and/or a guidance grid, from the field database 424 to the user interface 402. Additionally or alternatively, the application area processor 404 can trigger the application rate processor 406 to provide stored characteristics of an application session associated with the field from the application database 436, such as an application rate(s), an amount of product to be dispensed or collected during the application session, application rate values associated with rate management zones, etc., to the user interface 402. Accordingly, the operator of the agricultural vehicle 102 can indicate whether the stored characteristics of the field and/or the associated application session are aligned with the instant application session. In FIG. 5, in response to the operator indicating that the stored characteristics are aligned with the instant application session, the machine readable instructions 500 proceed to block 520. Alternatively, in response to the operator indicating that the stored characteristics are not to be utilized, the machine readable instructions 500 proceed to block 508.

At block 508, the rate control system 104 determines a field boundary (e.g., a perimeter of the field). For example, the boundary monitor 408 of the application area processor 404 determines the boundary of the field in response to the agricultural vehicle 102 traveling along the boundary. In some examples, the boundary monitor 408 tracks a location of the agricultural vehicle 102 as it travels along the boundary via the GPS/GNSS 412. In some such examples, the boundary monitor 408 determines a geometry of the boundary of the field in response to the agricultural vehicle 102 returning to a location where tracking of the boundary began. In some examples, the boundary monitor 408 presents a map of the current location of the agricultural vehicle 102 to the user interface 402 via the GPS/GNSS 412. In some such examples, the operator can indicate the boundary of the field to the GPS/GNSS 412 (e.g., by tracing the boundary on the map) via the user interface 402, which allows the boundary monitor 408 to determine the geometry of the boundary. In some examples, the boundary monitor 408 transmits the boundary of the field to the field area calculator 410, the guidance grid processor 414, the inefficiency processor 416, and/or the rate management zone processor 418.

At block 510, the rate control system 104 calculates an area of the field. In some examples, the application area processor 404 determines the area of the field associated with the application session. For example, the field area calculator 410 can calculate the area of the field based on the determined geometry and/or dimensions of the boundary of the field. In some examples, the field area calculator 410 analyzes the boundary of the field via the GPS/GNSS 412 to determine the area of the field.

At block 512, the rate control system 104 determines a guidance path for the agricultural vehicle 102 to follow along the field. In some examples, the application area processor 404 determines the guidance path to be followed during the application session. For example, the guidance grid processor 414 can determine the path for the agricultural vehicle 102 to follow along the field based on the determined boundary and/or area of the field. In some examples, the guidance grid processor 414 determines the path for the agricultural vehicle 102 to follow based on travel characteristics (e.g., a turn radius) associated with the agricultural vehicle 102, application characteristics associated with the applicator 106 (e.g., the coverage, the granular control capability, etc.). In some examples, the guidance grid processor 414 integrates the guidance path with the map of the field via the GPS/GNSS 412. In some such examples, the guidance grid processor 414 transmits the map of the field with the guidance path to the user interface 402. In some examples, the operator can adjust the guidance path via the user interface 402 in advance of and/or during the application session. In such examples, the user interface 402 transmits the updated guidance path to the application area processor 404. Accordingly, the guidance grid processor 414 can identify the updated guidance path. In some examples, the operator can utilize the user interface 402 to follow the guidance path. In some other examples, the operator can provide an indication to the user interface 402 to hide the guidance path.

At block 514, the rate control system 104 determines an inefficiency associated with the application session. In some examples, the application area processor 404 determines an overlap factor and/or a maneuverability of the agricultural vehicle 102 based on the boundary of the field, the guidance path, the application characteristics associated with the applicator 106, and/or characteristics associated with the field, such as an elevation, a wetness, etc., that affect the maneuverability of the agricultural vehicle 102. For example, the inefficiency processor 416 of the application area processor 404 determines a percentage of the area of the field that will be overlapped by the applicator 106 during the application session based on the determined guidance path and/or boundary of the field. In such examples, the determined guidance path and/or boundary reflects irregularities in the geometry of the field that will cause the applicator 106 to overlap a portion of the field during the application session. In some examples, the inefficiency processor 416 determines areas of the field that are associated with reduced travel speeds of the agricultural vehicle 102 such as, areas with an increasing elevation and/or a low elevation including an excessive wetness in response to a rainstorm. In turn, the application area processor 404 transmits the determined inefficiency of the application session to the application rate processor 406, which enables the application rate processor to consider the inefficiency when determining the application rate for the application session. In some examples, the application rate calculator 432 receives the inefficiency associated with the application session.

At block 516, the rate control system 104 identifies rate management areas associated with the field. In some examples, the application area processor 404 determines the rate management areas associated with the field. For example, the user interface 402 can prompt the operator to indicate areas of the field where the application rate will differ from the majority of the field via the map of the field presented by the GPS/GNSS 412 at the user interface 402. In addition, the user interface 402 can prompt the operator to indicate the application rate values, offsets, and/or rate multipliers associated with the rate management zones. In some examples, the user interface 402 assigns a certain identifier to each identified rate management area. In some such examples, the user interface 402 transmits the location, the application value, and/or the identifier of the rate management areas to the application area processor 404 and/or the application rate processor 406. In some examples, the rate management zone processor 418 determines an area of each of the rate management zones via the GPS/GNSS 412.

In some examples, the application area processor 404 transmits the area of the prescription zones and the associated identifiers to the application rate processor 406. In some examples, the application rate calculator 432 and/or the rate adjustment processor 434 receive the rate management zone identifiers, areas, and/or application rates. In some examples, the rate adjustment processor 434 links the rate management zone identifier with the application rate. In some examples, the application rate calculator 432 links the application rate of the rate management zone with the associated area. In some other examples, the operator indicates that the field does not include rate management areas.

At block 518, the rate control system 104 stores the determined characteristics of the field in the field database 424. In some examples, the application area processor 404 stores the boundary, the area, the location, the guidance path, the inefficiency, and/or the rate management zones in the field database 424. For example, the boundary monitor 408, the field area calculator 410, the GPS/GNSS 412, the guidance grid processor 414, the inefficiency processor 416, and/or the rate management zone processor 418 can store the determined boundary, area, location, guidance path, inefficiency, and/or rate management zones in the field database 424, respectively, with an identifier indicative of the field and/or the application session.

At block 520, the rate control system 104 determines a starting product amount on the agricultural vehicle 102. In some examples, the application rate processor 406 determines the starting amount of product on the agricultural vehicle 102. For example, the product amount sensor 426 can determine a quantity, a weight, and/or a volume of product on the agricultural vehicle 102. In some examples, the application rate processor 406 can prompt the operator to input the starting product amount via the user interface 402. In such examples, the application rate processor 406 determines the starting product amount based on a response of the operator at the user interface 402.

At block 522, the rate control system 104 determines a final product amount to be remaining on the agricultural vehicle 102 after completion of the application session. In some examples, the application rate processor 406 determines the final product amount to be leftover when the application session is complete. For example, the application rate processor 406 can transmit a request to the user interface 402, which prompts the operator of the agricultural vehicle 102 to input the final product amount. In some examples, the end product processor 428 determines an amount of product to be utilized during the application session based on the final product amount and the starting product amount.

At block 524, the rate control system 104 determines an initial application rate to be implemented by the applicator 106. In some examples, the application rate processor 406 determines the initial application rate to be implemented by the applicator 106. For example, the application rate calculator 432 can determine the initial application rate based on the amount of product to be utilized, the area of the field, the inefficiency associated with the field, the rate management areas and associated application values, and/or the application characteristics associated with the applicator 106. In some other examples, the rate control system 104 presents the initial application rate to the operator of the agricultural vehicle 102 via the user interface 402. In some examples, the rate control system 104 transmits the initial application rate to the applicator 106, which begins dispensing or collecting product at the determined application rate. In such examples, the rate control system 104 guides the operator while enabling the operator to utilize personal experience and/or expertise.

In some examples, the application rate processor 406 determines the initial application rate based on data from a previous application session at the same field. For example, the session history processor 422 can correlate fields stored in the field database with the location of the agricultural vehicle 102 via the GPS/GNSS 412. Accordingly, the session history processor 422 can identify the characteristics associated with the field in the field database 424 in response to the agricultural vehicle 102 approaching the field. The application area processor 404 can transmit the characteristics and/or the identifier associated with the field and/or the application session to the application rate processor 406. Further, the application rate calculator 432 can calculate the initial application rate based on the characteristics associated with the field. In some examples, the rate adjustment processor 434 identifies the identifier associated with the field and/or the associated application session in the application database 436 to determine the initial application rate previously utilized. Further, the rate adjustment processor 434 can compare the previously utilized initial application rate to the initial application rate calculated by the application rate calculator 432. In some examples, the application rate processor 406 transmits the previously utilized initial application rate and the calculated initial application rate to the user interface 402, which enables the operator to indicate which initial application to utilize for the instant application session. In some examples, the application rate processor 406 recommends that the calculated initial application rate be utilized via the user interface 402.

At block 526, the rate control system 104 records the determined application rate in the application database 436. In some examples, the application rate processor 406 stores the application rate with an identifier associated with the field and/or the application session. For example, the application rate calculator 432 and/or the rate adjustment processor 434 can store the determined application rate and the associated field in the application database 436 with a timestamp to specify the application session. As such, the rate control system 104 can utilize the stored application rate in subsequent application sessions at the same field.

FIG. 6 is a second flowchart representative of machine readable instructions 600 which may be executed to implement the example rate control system 104 of FIGS. 1, 2, 3, and/or 4 to determine adjustments to the application rate throughout the first field, the second field, and/or the third field of FIGS. 1, 2, and/or 3. As such, the machine readable instructions 600 enable the rate control system 104 to be activated and/or utilized during an application session. The machine executable instructions begin at block 602, at which the rate control system 104 identifies a location of the agricultural vehicle 102. In some examples, the application area processor 404 determines the location of the agricultural vehicle 102. For example, the GPS/GNSS 412 can identify the location of the agricultural vehicle 102.

At block 604, the rate control system 104 determines whether the location of the agricultural vehicle 102 is in a rate management zone. In some examples, the application area processor 404 compares the location of the agricultural vehicle 102 to the rate management zone(s) associated with the field. For example, the rate management zone processor 418 can compare the location(s) associated with the rate management zone(s) to the location of the agricultural vehicle 102 to determine whether the agricultural vehicle 102 is entering the rate management zone(s). In some examples, in response to the agricultural vehicle 102 entering or being located in the rate management zone(s), the application area processor 404 transmits the identifier associated with the rate management zone to the application rate processor 406 and the machine readable instructions 600 proceed to block 606. In some examples, in response to the agricultural vehicle 102 not being located in or entering the rate management zone, the machine readable instructions 600 continue to block 608.

At block 606, the rate control system 104 determines an application rate associated with the rate management zone in response to the agricultural vehicle 102 entering the rate management zone. In some examples, the application rate processor 406 determines the application rate value, the offset, and/or the rate multiplier associated with the rate management zone in response to receiving the identifier associated with the rate management zone that the agricultural vehicle 102 is entering or located in. For example, the rate adjustment processor 434 can determine the application rate value, the offset, and/or the rate multiplier associated with the identifier of the rate management zone in response to the application rate processor 406 receiving the identifier. In some examples, the rate adjustment processor 434 indicates the offset and/or the rate multiplier associated with the identifier of the rate management zone to the application rate calculator 432. In turn, the application rate calculator 432 can calculate the application rate to be implemented by the applicator 106. In some examples, the rate control system 104 controls the applicator 106 to implement the application rate associated with the rate management zone. In some examples, the application rate processor 406 presents the application rate to the operator of the agricultural vehicle 102 via the user interface 402.

At block 608, the rate control system 104 identifies an application rate being implemented by the applicator 106. In some examples, the application rate processor 406 determines the application rate being implemented by the applicator 106 based on a change in the amount of product on the agricultural vehicle 102 over time. For example, the product amount sensor 426 can determine the application rate being implemented by the applicator 106 based on changes in the sensed amount of product on the agricultural vehicle 102 over time. In some examples, the applicator CPU 430 determines the application rate being implemented by the applicator 106.

At block 610, the rate control system 104 determines an area of the field that has been covered during the application session. In some examples, the application area processor 404 determines the area of the field covered by the applicator 106 during the application session. For example, the covered area tracker 420 can monitor the location of the agricultural vehicle 102 throughout the application session via the GPS/GNSS 412. In turn, the covered area tracker 420 can determine the area of the field that has been covered based on the coverage of the applicator 106 and the tracked location of the agricultural vehicle 102. In some examples, the covered area tracker 420 begins monitoring the location of the agricultural vehicle 102 in response to activation of the applicator 106. In some examples, the covered area tracker 420 indicates the covered area of the field to the rate management zone processor 418 and/or the field area calculator 410. In turn, the rate management zone processor 418 can determine areas of rate management zones that have been covered by the applicator 106. In some examples, the application area processor 404 indicates the covered area of the field and/or characteristics associated therewith to the application rate processor 406.

At block 612, the rate control system 104 calculates a remaining area of the field to be covered. In some examples, the application area processor 404 determines the remaining area of the field to be covered based on a determined area of the field (e.g., a total area) and the covered area of the field. For example, the field area calculator 410 can calculate the remaining area of the field to be covered based on the determined area of the field and the covered area of the field. In some examples, the covered area tracker 420 links the coverage of the field with the GPS/GNSS 412. Accordingly, the inefficiency processor 416 can identify an inefficiency associated with the remaining area of the field. In addition, the rate management zone processor 418 can identify the covered rate management zones. Further, the application area processor 404 can indicate characteristics associated with the remaining area of the field, such as an area, an identifier of the remaining rate management zones, and/or an inefficiency associated with the remaining area, to the application rate processor 406.

At block 614, the rate control system 104 determines an amount of product on the vehicle 102. In some examples, the application rate processor 406 determines the amount of product remaining in a supply on the vehicle 102. For example, the product amount sensor 426 can determine a quantity, a weight, and/or a volume of product on the agricultural vehicle 102. In some examples, the product amount sensor 426 transmits the amount of product on the vehicle 102 to the end product processor 428, the rate adjustment processor 434, and/or the application rate calculator 432. In some such examples, the end product processor 428 determines a remaining amount of product to be utilized during the application session based on the amount of product on the vehicle 102 and the determined end product amount.

At block 616, the rate control system 104 calculates an application rate that results in the determined end product amount when the application session is complete. In some examples, the application rate processor 406 determines the application rate based on the remaining amount of product on the agricultural vehicle, the determined end product amount, and/or the remaining area of the field. For example, the application rate calculator 432 can calculate the remaining area of the field based on the remaining amount of product to be utilized during the application session, the application characteristics associated with the applicator 106, and/or the characteristics associated with the remainder of the field, such as an area, an inefficiency, and/or areas of rate management zones and associated application values.

At block 618, the rate control system 104 determines whether the application rate implemented by the applicator 106 (e.g., a first application rate) matches the calculated application rate (e.g., a second application rate). In some examples, the application rate processor 406 compares the implemented application rate to the calculated application rate. For example, the rate adjustment processor 434 can compare the application rate implemented by the applicator 106 to the application rate calculated by the application rate calculator 432, which enables the rate adjustment processor 434 to determine whether to adjust the application rate implemented by the applicator 106. Accordingly, the machine readable instructions 600 proceed to block 620 in response to the application rate implemented by the applicator 106 not matching the calculated application rate. Alternatively, the machine readable instructions 600 proceed to block 622 in response to the application rate implemented by the applicator 106 matching the calculated application rate.

At block 620, the rate control system 104 adjusts the application rate based on the remaining amount of product to be collected and/or dispensed, the application characteristics associated with the applicator 106, and/or the remaining area of the field and characteristics associated therewith. In some examples, the application rate processor 406 adjusts the application rate implemented by the applicator 106 to match the calculated application rate. For example, the rate adjustment processor 434 can determine to override the current application rate with the application rate calculated by the application rate calculator 432. In some examples, the rate control system 104 transmits the calculated application rate to the applicator 106, which implements the calculated application rate accordingly. In some examples, the rate control system 104 indicates the calculated application rate to the operator of the agricultural vehicle 102 via the user interface 402.

At block 622, the rate control system 104 records the application rate with the location of the agricultural vehicle 102. In some examples, the application rate processor 406 stores the application rate being implemented by the applicator 106. For example, the rate adjustment processor 434 can store the calculated application rate in the application database 436 in response to the calculated application rate being different from the application rate implemented by the applicator 106.

In some examples, the rate control system 104 stores the calculated application rate with the location of the agricultural vehicle 102. For example, the application rate processor 406 can trigger the application area processor 404 to store the location of the agricultural vehicle 102 in response to storing the application rate change. Accordingly, the GPS/GNSS 412 can store the location of the agricultural vehicle 102 and, thus, the location of the application rate change in the field database 424 with an identification value and/or timestamp. In some examples, the rate adjustment processor 434 stores a timestamp and/or the identification value associated with the change in the application rate to enable an associated location of the agricultural vehicle 102 to be determined. In some examples, the application rate calculator 432 stores the application rate in response to calculating the application rate. In some examples, the rate control system 104 determines the initial application rate for a subsequent application session at the same field based on the application rates stored in the application database 436.

At block 624, the rate control system 104 determines whether the end product amount has been reached. In some examples, the application rate processor 406 determines whether the agricultural vehicle 102 includes the final product amount indicated by the operator. For example, the product amount sensor 426 can measure the amount of product stored on the agricultural vehicle 102. Further, the end product processor 428 can compare the product amount on the agricultural vehicle 102 to the end product amount. The machine readable instructions 600 return to block 602 in response to the amount of product stored on the agricultural vehicle 102 not matching the end product amount. Alternatively, the machine readable instructions 600 terminate in response to the end product amount being reached.

Figure 7:
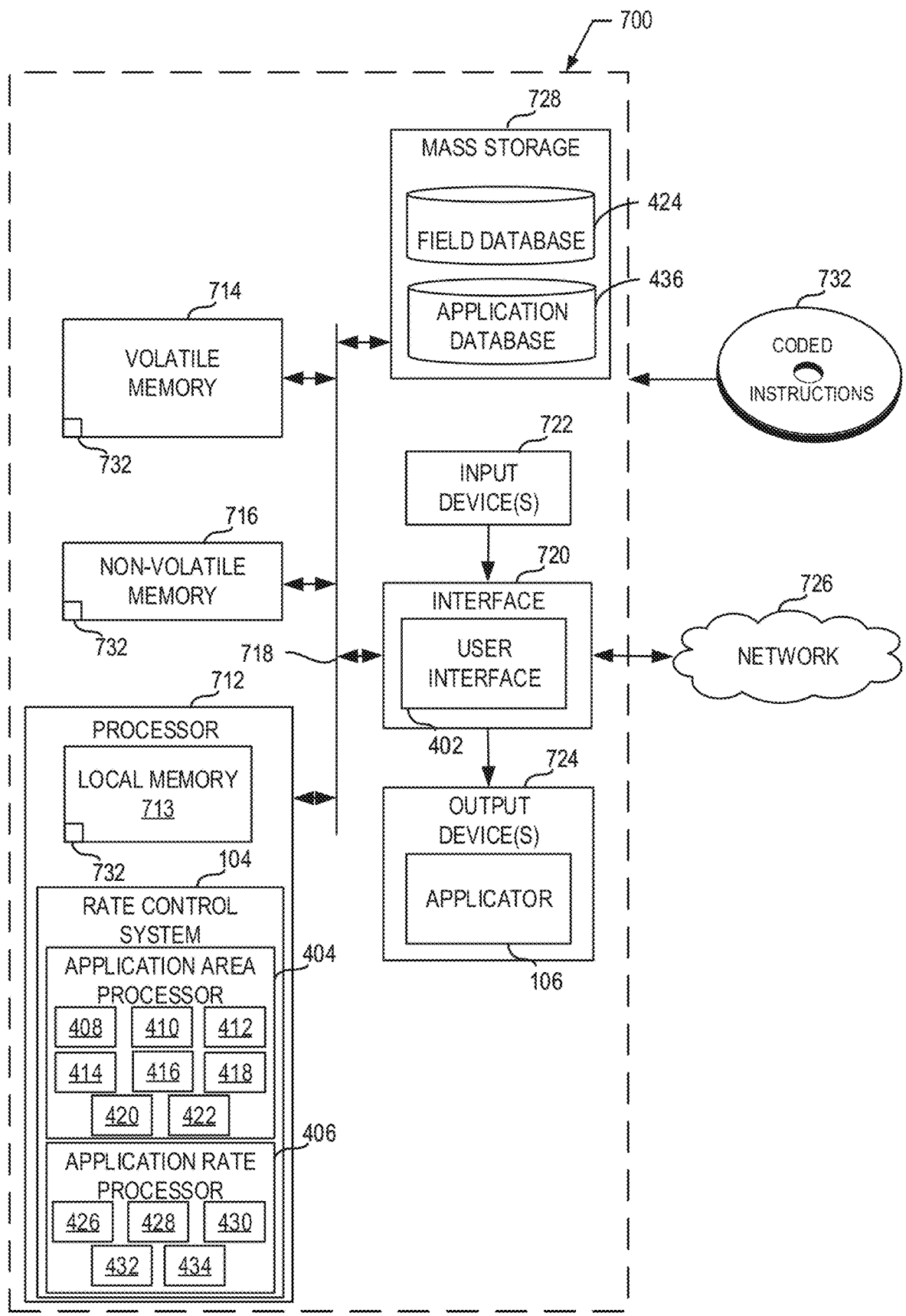
FIG. 7 is a block diagram of an example processing platform structured to execute the instructions of FIGS. 5 and 6 to implement the example application rate control system of FIGS. 1, 2, 3, and 4.

FIG. 7 is a block diagram of an example processor platform 700 structured to execute the instructions of FIGS. 5 and 6 to implement the rate control system 104 of FIG. 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the application area processor 404 including the boundary monitor 408, the field area calculator 410, the GPS/GNSS 412, the guidance grid processor 414, the inefficiency processor 416, the rate management zone processor 418, the covered area tracker 420, and the session history processor 422, and the application rate processor 406 including the product amount sensor 426, the end product processor 428, the applicator CPU 430, the application rate calculator 432, and the rate adjustment processor 434.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor. In this example, the output device(s) 724 includes the applicator 106 of FIGS. 1, 2, 3, and/or 4.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 720 includes the user interface 402.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the one or more mass storage devices 728 includes the field database 424 and the application database 436.

The machine executable instructions 732 of FIGS. 5 and 6 may be stored in the mass storage device 728, in the volatile memory 714, in the non-volatile memory 716, and/or on a removable non-transitory computer readable storage medium such as a CD or DVD.

Figure 8:
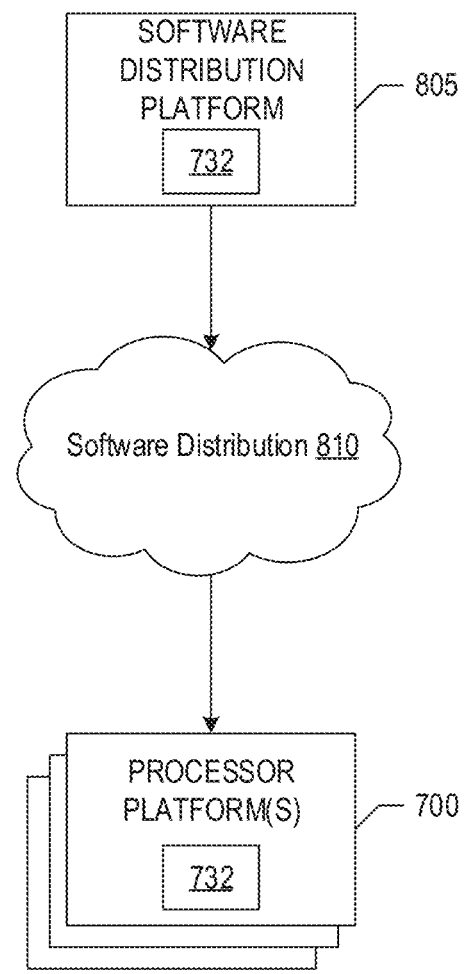
FIG. 8 is a block diagram of an example software distribution platform to distribute software (e.g., software corresponding to the example computer readable instructions of FIGS. 5 and/or 6) to client devices such as tractors and/or irrigation systems with implements, consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example computer readable instructions 500 and 600 of FIGS. 5 and 6, as described above. The one or more servers of the example software distribution platform 805 are in communication with a network 810, which may correspond to any one or more of the Internet and/or any of the example networks 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions 500 and 600 of FIGS. 5 and 6, may be downloaded to the example processor platform 700, which is to execute the computer readable instructions 732 to implement the rate control system 104. In some example, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

From the foregoing, it will be appreciated that example methods, apparatus and articles of manufacture have been disclosed that dynamically control a rate of dispensing and/or collecting product across a field based on the amount of product to be collected and/or dispensed and characteristics associated with the field. In turn, the example methods, apparatus, and articles of manufacture disclosed herein minimize or otherwise reduce inconsistent and/or inefficient coverage of fields during agricultural application sessions.

Example methods, apparatus, systems, and articles of manufacture to control agricultural application rates are disclosed herein. Further examples and combinations thereof include the following:

Example 1 includes a system to control agricultural application rates comprising an application area processor to determine an area of a field to be covered during an application session, and an application rate processor including an end product processor to determine an amount of product to be utilized during the application session, the amount of product to be utilized based on an amount of product on a vehicle and a final product amount, and an application rate calculator to determine a first application rate to be implemented by an applicator based on the amount of product to be utilized and the area of the field to be covered.

Example 2 includes the system of example 1, wherein the application area processor is to determine a remaining area of the field to be covered in response to the field being partially covered.

Example 3 includes the system of example 2, wherein the application rate calculator is to determine a second application rate based on a remaining amount of product to be utilized during the application session and the remaining area of the field to be covered.

Example 4 includes the system of example 3, further including a rate adjustment processor to compare the first application rate to the second application rate, the system to transmit the second application rate to the applicator or a user interface in response to the second application rate being different from the first application rate.

Example 5 includes the system of example 1, further including a user interface to receive at least one of the amount of product on the vehicle, the final product amount, a path for the vehicle to follow, or a coverage of the applicator.

Example 6 includes the system of example 1, wherein the application rate calculator is to determine the first application rate based on a coverage of the applicator, the coverage of the applicator including an area covered by the applicator.

Example 7 includes the system of example 1, wherein the application area processor includes a boundary monitor to determine a boundary of the field to be covered.

Example 8 includes the system of example 7, wherein the application area processor includes a field area calculator to calculate the area of the field to be covered based on the boundary of the field.

Example 9 includes the system of example 8, wherein the application area processor includes a guidance grid processor to determine a guidance path for the vehicle to follow based on at least one of the boundary of the field, the area of the field, a reference application session, or an indication from an operator.

Example 10 includes the system of example 9, wherein the application area processor includes an inefficiency processor to determine an inefficiency associated with the application session based on at least one of the guidance path, the boundary of the field, the area of the field, or application characteristics associated with the applicator.

Example 11 includes a method of controlling an agricultural application rate, the method comprising determining an area of a field to be covered during an application session, determining an amount of product to be utilized during the application session, and determining a first application rate based on the amount of product to be utilized during the application session, and the area of the field to be covered during the application session.

Example 12 includes the method of example 11, further including determining a remaining area of the field to be covered in response to the area of the field being at least partially covered.

Example 13 includes the method of example 12, further including determining a remaining amount of product to be utilized, and determining whether the first application rate over the remaining area of the field results in the amount of product to be utilized during the application session based on the remaining amount of product and the remaining area of the field.

Example 14 includes the method of example 13, further including determining a second application rate for the remaining area of the field in response to the first application rate over the remaining area of the field not resulting in the amount of product to be utilized during the application session.

Example 15 includes the method of example 11, further including determining a boundary of the field to be covered, the area of the field to be covered during the application session based on the boundary of the field.

Example 16 includes the method of example 11, further including determining a path for a vehicle to follow during the application session.

Example 17 includes the method of example 16, further including determining an inefficiency of the application session based on the path for the vehicle to follow, the first application rate to be calculated based on the inefficiency of the application session.

Example 18 includes One or more non-transitory computer readable media comprising instructions which, when executed, cause one or more processors to at least determine an area of a field to be covered during an application session, determine an amount of product to be utilized during the application session, and calculate a first application rate based on the amount of product to be utilized during the application session and the area of the field to be covered during the application session.

Example 19 includes the one or more non-transitory computer readable media of example 18, wherein the instructions, when executed, cause the one or more processors to determine a covered field area.

Example 20 includes the one or more non-transitory computer readable media of example 19, wherein the instructions, when executed, cause the one or more processors to determine a remaining amount of product to be utilized, determine a remaining area to be covered based on the area of the field and the covered field area, and determine a second application rate based on the remaining area to be covered and the remaining amount of product to be utilized.

Example 21 includes the one or more non-transitory computer readable media of example 20, wherein the instructions, when executed, cause the one or more processors to compare the first application rate and the second application rate, and transmit the second application rate to an applicator in response to the second application rate being different from the first application rate.

Example 22 includes the one or more non-transitory computer readable media of example 18, wherein the instructions, when executed, cause the one or more processors to determine a boundary of the field to be covered, the area of the field to be covered based on the boundary of the field.

Example 23 includes the one or more non-transitory computer readable media of example 22, wherein the instructions, when executed, cause the one or more processors to determine an inefficiency associated with the application session based on the boundary of the field, wherein the first application rate is to be calculated based on the inefficiency of the application session.

Example 24 includes an apparatus comprising memory, and one or more processors to execute instructions to determine an area of a field to be covered during an application session, determine an amount of product to be utilized during the application session, the amount of product to be utilized based on an amount of product on a vehicle and a final product amount, and determine a first application rate to be implemented by an applicator based on the amount of product to be utilized and the area of the field to be covered.

Example 25 includes the apparatus of example 24, wherein the instructions, when executed, cause the one or more processors to determine a remaining area of the field to be covered in response to the field being partially covered.

Example 26 includes the apparatus of example 25, wherein the instructions, when executed, cause the one or more processors to determine a second application rate based on a remaining amount of product to be utilized during the application session and the remaining area of the field to be covered.

Example 27 includes the apparatus of example 26, wherein the instructions, when executed, cause the one or more processors to transmit the second application rate to the applicator or a user interface in response to the second application rate being different from the first application rate.

Example 28 includes the apparatus of example 24, wherein the instructions, when executed, cause the one or more processors to receive at least one of the amount of product on the vehicle, the final product amount, a path for the vehicle to follow, or a coverage of the applicator.

Example 29 includes the apparatus of example 24, wherein the instructions, when executed, cause the one or more processors to determine the first application rate based on a coverage of the applicator, the coverage of the applicator including an area covered by the applicator.

Example 30 includes the apparatus of example 24, wherein the instructions, when executed, cause the one or more processors to determine a boundary of the field to be covered.

Example 31 includes the apparatus of example 30, wherein the instructions, when executed, cause the one or more processors to calculate the area of the field to be covered based on the boundary of the field.

Example 32 includes the apparatus of example 31, wherein the instructions, when executed, cause the one or more processors to determine a guidance path for the vehicle to follow based on at least one of the boundary of the field, the area of the field, a reference application session, or an indication from an operator.

Example 33 includes the apparatus of example 32, wherein the instructions, when executed, cause the one or more processors to determine an inefficiency associated with the application session based on at least one of the guidance path, the boundary of the field, the area of the field, or application characteristics associated with the applicator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system to control agricultural application rates comprising:
  an application area processor to:
    determine an area of a field to be covered during an application session;
    determine an inefficiency associated with the application session based on at least one of a guidance path for a vehicle, a boundary of the field, the area of the field, elevation changes in the field, or application characteristics associated with an applicator operatively coupled to the vehicle; and
  an application rate processor including:
    an end product processor to determine an amount of product to be utilized during the application session, the amount of product to be utilized based on an amount of product on the vehicle and a final product amount; and
    an application rate calculator to determine an initial application rate to be implemented by the applicator at or before a start of covering the field based on the amount of product to be utilized, the area of the field to be covered, and the inefficiency associated with the application session.

2. The system of claim 1, further including a user interface to receive at least one of the amount of product on the vehicle, the final product amount, the guidance path for the vehicle to follow, or a coverage of the applicator.

3. The system of claim 1, wherein the application rate calculator is to determine the initial application rate based on a coverage of the applicator, the coverage of the applicator including an area covered by the applicator.

4. The system of claim 1, wherein the application area processor includes a boundary monitor to determine the boundary of the field to be covered.

5. The system of claim 4, wherein the application area processor includes a field area calculator to calculate the area of the field to be covered based on the boundary of the field.

6. The system of claim 5, wherein the application area processor includes a guidance grid processor to determine the guidance path for the vehicle to follow based on at least one of the boundary of the field, the area of the field, a reference application session, or an indication from an operator, and wherein the application area processor is to the inefficiency based on a predetermined overlap that the applicator is to encounter when the vehicle follows the guidance path.

7. The system of claim 6, wherein the inefficiency is a first inefficiency, and wherein, in response to covering a portion of the field, the application area processor is to determine a second inefficiency based on a difference between an observed path of the vehicle and the determined guidance path, and wherein the application rate processor is to determine a second application rate based on the second inefficiency.

8. The system of claim 1, wherein the inefficiency associated with the application session is an inefficient usage of product during the application session.

9. The system of claim 1, wherein the inefficiency associated with the application session includes an area of the field to be overlapped by the applicator during the application session, an area outside of the field to be covered by the applicator during the application session, or an area of the field associated with a reduced speed of the vehicle during the application session.

10. A method of controlling an agricultural application rate, the method comprising:
    determining an area of a field to be covered during an application session;
    determining an amount of product to be utilized during the application session based on an amount of product on a vehicle and a final product amount to be remaining on the vehicle after covering the field;
    determining an inefficiency associated with the application session based on at least one of a path for the vehicle, a boundary of the field, the area of the field, elevation changes in the field, or application characteristics associated with an applicator operatively coupled to the vehicle; and
    determining an initial application rate before starting to cover the field based on the amount of product to be utilized during the application session, the area of the field to be covered during the application session, and the inefficiency associated with the application session.

11. The method of claim 10, further including determining a remaining area of the field to be covered in response to the area of the field being at least partially covered.

12. The method of claim 11, further including:
    determining a remaining amount of product to be utilized; and
    determining whether the initial application rate over the remaining area of the field results in the amount of product to be utilized during the application session based on the remaining amount of product and the remaining area of the field.

13. The method of claim 12, further including determining a second application rate for the remaining area of the field in response to the initial application rate over the remaining area of the field not resulting in the amount of product to be utilized during the application session.

14. The method of claim 10, further including determining the boundary of the field to be covered, the area of the field to be covered during the application session based on the boundary of the field.

15. The method of claim 10, further including determining the path for the vehicle to follow during the application session.

16. One or more non-transitory computer readable media comprising instructions which, when executed, cause one or more processors to at least:
    determine an area of a field to be covered during an application session;
    determine an amount of product to be utilized during the application session based on an amount of product on a vehicle and a final product amount to be remaining on the vehicle after covering the field;
    determine an inefficiency associated with the application session based on at least one of a guidance path for the vehicle, a boundary of the field, the area of the field, elevation changes in the field, or application characteristics associated with an applicator operatively coupled to the vehicle; and
    calculate an initial application rate in advance of starting to cover the field based on the amount of product to be utilized during the application session, the area of the field to be covered during the application session, and the inefficiency associated with the application session.

17. The one or more non-transitory computer readable media of claim 16, wherein the instructions, when executed, cause the one or more processors to determine the boundary of the field to be covered, the area of the field to be covered based on the boundary of the field.

18. The one or more non-transitory computer readable media of claim 16, wherein the inefficiency includes a usage of product during the application session outside of the field.

19. The one or more non-transitory computer readable media of claim 16, wherein the inefficiency includes an area of the field to be overlapped by the applicator during the application session.

20. The one or more non-transitory computer readable media of claim 16, wherein the inefficiency is based on elevation changes in the field.

21. An apparatus comprising:
    memory; and
    one or more processors to execute instructions to:
        determine an area of a field to be covered during an application session;
        determine an amount of product to be utilized during the application session, the amount of product to be utilized based on an amount of product on a vehicle and a final product amount;
        determine an inefficiency associated with the application session based on at least one of a path for the vehicle, a boundary of the field, the area of the field, elevation changes in the field, or application characteristics associated with an applicator operatively coupled to the vehicle; and determine an initial application rate to be implemented by the applicator for the application session based on the amount of product to be utilized, the area of the field to be covered, and the inefficiency associated with the application session.

22. The apparatus of claim 21, wherein the one or more processors are to determine the boundary of the field to be covered, the area of the field to be covered based on the boundary of the field.

23. The apparatus of claim 21, wherein the one or more processors are to determine the path for the vehicle to follow during the application session.

24. The apparatus of claim 23, wherein the one or more processors are to determine the path based on at least one of the boundary of the field, the area of the field, a reference application session, or an indication from an operator.

\* \* \* \* \*